US011101996B2

(12) United States Patent
Canillas et al.

(10) Patent No.: US 11,101,996 B2
(45) Date of Patent: Aug. 24, 2021

(54) TPM-BASED DATA INTEGRITY

(71) Applicant: Red Hat, Inc., Raleigh, NC (US)

(72) Inventors: Francisco Javier Martinez Canillas, Barcelona (ES); Alberto Carlos Ruiz Ruiz, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/685,275

(22) Filed: Nov. 15, 2019

(65) Prior Publication Data

US 2021/0152353 A1    May 20, 2021

(51) Int. Cl.
*H04L 29/06*    (2006.01)
*G06F 21/64*    (2013.01)
*H04L 9/08*    (2006.01)
*H04L 9/30*    (2006.01)

(52) U.S. Cl.
CPC ............ *H04L 9/0877* (2013.01); *G06F 21/64* (2013.01); *H04L 9/0825* (2013.01); *H04L 9/3073* (2013.01)

(58) Field of Classification Search
CPC ... H04L 9/0877; H04L 9/0825; H04L 9/3073; H04W 12/009; G06F 21/64
See application file for complete search history.

(56) References Cited

U.S. PATENT DOCUMENTS

| 6,131,162 | A | * | 10/2000 | Yoshiura | G06T 1/0021 |
| | | | | | 713/176 |
| 7,711,960 | B2 | | 5/2010 | Scarlata | |
| 8,438,450 | B2 | | 5/2013 | Isnardi et al. | |
| 8,804,956 | B2 | | 8/2014 | Hiriart | |
| 8,989,376 | B2 | | 3/2015 | Ren et al. | |
| 2008/0276092 | A1 | * | 11/2008 | Eberhardt | H04L 9/3271 |
| | | | | | 713/175 |
| 2011/0320823 | A1 | * | 12/2011 | Saroiu | H04L 9/3218 |
| | | | | | 713/189 |
| 2018/0241560 | A1 | * | 8/2018 | Chen | H04L 9/3247 |
| 2019/0332819 | A1 | * | 10/2019 | Szajda | G06F 21/6209 |
| 2020/0266997 | A1 | * | 8/2020 | Monica | H04L 9/0822 |
| 2020/0274699 | A1 | * | 8/2020 | Watson | H04L 9/0822 |

* cited by examiner

*Primary Examiner* — Thaddeus J Plecha
(74) *Attorney, Agent, or Firm* — K&L Gates LLP

(57) ABSTRACT

The present disclosure provides for a system ensuring the integrity of received data. The system includes a processor, a trusted platform module, and a memory storing instructions. Upon a request from the processor, the trusted platform module generates an asymmetric key pair including a private key and a public key. The trusted platform module provides the public key and an encrypted private key to the processor. The processor generates a checksum of received content data and sends the checksum to the trusted platform module. The processor also loads the encrypted private key into the trusted platform module. The trusted platform module decrypts the encrypted private key, encrypts the checksum with the private key, and provides the encrypted checksum to the processor. The processor sends the content data together with the encrypted checksum to an external device. The external device may decrypt the encrypted checksum with the public key.

20 Claims, 7 Drawing Sheets

TPM-BASED DATA INTEGRITY

BACKGROUND

Computer systems may routinely transmit information from one computer system to another. For example, a computer system may transmit media or sensitive data over a network to another computer system. Processors of computer systems transmitting the information may execute instructions to encrypt the information or to cryptographically sign the information prior to transmitting it. For example, the processors may utilize a public or private key of an asymmetric key pair to encrypt or sign the information. Processors of computer systems receiving the information may execute instructions to decrypt the information or to verify the cryptographic signature prior to processing it. For example, the processors may utilize the other of the public or private key in the pair to decrypt the information or verify the signature.

SUMMARY

The present disclosure provides new and innovative systems and methods for data integrity. In an example, a system includes a processor, a trusted platform module, and a memory storing instructions, which when executed by the processor, cause the processor to receive content data, generate a checksum of the content data, send the checksum to the trusted platform module, and load an encrypted private key into the trusted platform module. The trusted platform module is configured to decrypt the encrypted private key to obtain a private key, and to encrypt the checksum with the private key. The instructions further cause the processor to receive the encrypted checksum from the trusted platform module, and send the content data together with the encrypted checksum to an external device. The private key belongs to an asymmetric key pair generated by the trusted platform module. The asymmetric key pair includes the private key and a public key.

In an example, a method includes receiving content data. The method also includes generating a checksum of the content data. The method also includes sending the checksum to a trusted platform module. The method also includes loading an encrypted private key into the trusted platform module. The trusted platform module decrypts the encrypted private key to obtain a private key and encrypts the checksum with the private key. The method also includes receiving the encrypted checksum from the trusted platform module. The method also includes sending the content data together with the encrypted checksum to an external device. The private key belongs to an asymmetric key pair generated by the trusted platform module. The asymmetric key pair includes the private key and a public key.

In an example, a non-transitory computer-readable medium stores instructions which, when performed by a processor, cause the processor to receive content data. The instructions also cause the processor to generate a checksum of the content data. The instructions also cause the processor to send the checksum to a trusted platform module. The instructions also cause the processor to load an encrypted private key into the trusted platform module. The trusted platform module decrypts the encrypted private key to obtain a private key and encrypts the checksum with the private key. The instructions also cause the processor to receive the encrypted checksum from the trusted platform module. The instructions also cause the processor to send the content data together with the encrypted checksum to an external device. The private key belongs to an asymmetric key pair generated by the trusted platform module. The asymmetric key pair includes the private key and a public key.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
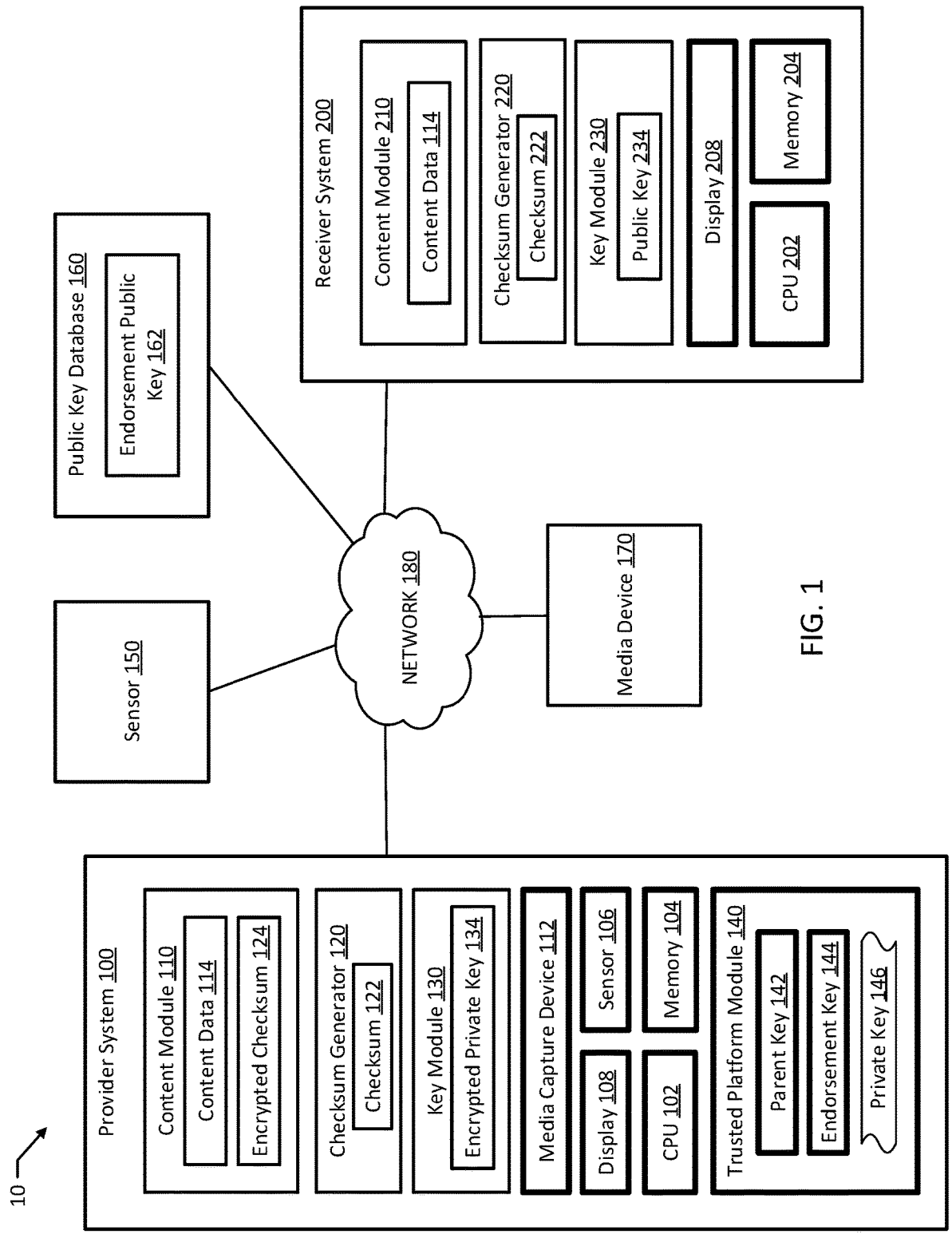
FIG. 1 illustrates an example system for data integrity assurance, including an example provider system and an example receiver system, according to an aspect of the present disclosure.

In the modern world, data is constantly communicated over networks from one source to another. Thus, people and systems alike consume large amounts of data that they receive from other sources. Often times the data is taken as true by the ultimate receiving source, whether that is a computing device or a person, if the receiving source does not have a reason to treat the data as false. For instance, a news company may communicate a video on a social media platform, which, at least many of the viewers will take as true events. In another instance, a self-driving car may communicate data from one of many sensors to a central on-board processor, which will process any data it receives and return a signal to various components of the self-driving car.

However, in some instances, dishonest actors may have a motive for those receiving sources to receive false information. As such, dishonest actors have found numerous techniques to alter content communicated over a network, or to communicate false content, while, in some cases, maintaining the appearance that the content has not been altered and is factual. For example, dishonest actors may utilize artificial intelligence and neural networks to find patterns of people, objects, etc. and insert those people, objects, etc. into pictures and/or videos to create fake pictures and videos, typically referred to as a Deep Fake. With the use of artificial intelligence, it can be difficult or virtually impossible to discern that the Deep Fake is an altered picture or video without additional information. In another example, dishonest actors may alter any type of data before it reaches its target computer system or may send false data to that target computer system, which cannot discern between altered/false data and genuine data. Accordingly, people and/or machines may treat false information as true, which in some cases can have highly damaging effects.

It should also be appreciated that in some instances a party and/or machine's mistaken or unintended breach of security may also cause false information appearing factual to be disseminated. In such instances, the party and/or machine might not have a motive for those receiving sources to receive false information and thus are not a dishonest actor. Nevertheless, such unintended data transmittals of unwittingly false information appearing factual may still have just as highly damaging effects as a dishonest actor's intent to deceive.

One way to help prevent dishonest actors from altering data in transit is by encrypting the data prior to transmitting it. The encrypted data is indecipherable and must be decrypted for a person or computer to read the data. However, only someone or a computer with the right encryption key (e.g., a password or cryptographic key) can decrypt the encrypted data. Therefore, dishonest actors cannot alter the data, while maintaining the appearance that it is not altered, if the dishonest actors cannot decipher what the data is. Nonetheless, if the encryption key for decrypting the data is not securely stored, a dishonest actor may steal the encryption key and then accordingly may decrypt the data and alter it.

In a similar method, instead of encrypting the data, a transmitting party may cryptographically sign the data. Signed data is not indecipherable like encrypted data, however, a cryptographic signature is unique to a particular cryptographic key (e.g., a private key in an asymmetric key pair) and may be verified by a cryptographic key corresponding to the particular key (e.g., a public key corresponding to the private key). Therefore, a receiving party may verify the signature with its public key to verify that the data originated from the party or system in possession of the particular private key. If the receiving party is unable to verify the signature with its public key, this is an indication that the signature was generated with a different private key, and thus may have been generated by a dishonest actor who altered the data. A dishonest actor is unable to imitate the signature of the particular private key unless the dishonest actor has possession of the particular private key. Nonetheless, if the particular private key is not securely stored, the dishonest actor may steal the particular private key and may cryptographically sign data with it.

In another method, a transmitting party may generate a checksum of the data and may send the checksum and the data to the receiving party. As used throughout this disclosure, a checksum refers to a sequence of numbers and letters used to check data for errors. To produce a checksum of a data file, a program may run the file through an algorithm (e.g., MD5, SHA-1, SHA-256, or SHA-512) that uses a cryptographic hash function that takes an input and produces a string of a fixed length. Checksums may also be referred to as hashes. Small changes in a file may produce very different looking checksums, and thus checksums may be compared to determine if any changes to a file have been made.

Accordingly, a receiving party may generate its own checksum of the received data and may compare it to the checksum sent by the transmitting party to determine whether the data has been altered after the transmitting party generated the checksum. In such a case, however, a dishonest actor may alter data, generate a checksum of the altered data, and transmit the checksum with the altered data to the receiving party. The receiving party's generated checksum would thus match the received checksum and it would appear to the receiving party that the data has not been altered, even though it has. Therefore, dishonest actors may circumvent each of the above security measures to provide false information that appears to be factual.

One way to attempt to enhance the above security measures, by providing an indication to end users that they received altered data from an unintended source, is by transmitting the data with a checksum signed or encrypted by a private key. The end users may then use the public key corresponding to the private key to verify the checksum was signed by the private key or to decrypt the encrypted checksum. However, the private key is stored on the operating system of the device sending the information or on a server in communication with the device. Thus, the private key is vulnerable to software attacks on the operating system and/or server that enable a dishonest actor to steal the private key. If a dishonest actor steals the private key, the dishonest actor may alter data, generate a new checksum of the altered data, and sign or encrypt the new checksum with the private key. Accordingly, to end users, the public key would verify the signature and/or decrypt the encrypted checksum and it would appear that the data has not been altered even though it has. Therefore, such a method does not provide adequate assurance of data source integrity.

Another way to attempt to provide data source integrity assurance is to sign or encrypt the checksums with a hardware authentication device, such as a YubiKey®, NitroKey®, and/or a smartcard. The hardware authentication device attempts to eliminate the above risks of a dishonest actor stealing a private key stored on the operating system or server because the hardware authentication device stores keys on the physical device itself. However, in at least some instances, the hardware authentication device is removable from the device it is used with to sign or encrypt a checksum. Thus, in such instances, a dishonest actor may be able to temporarily remove the hardware authentication device and sign or encrypt altered checksums on a different device to impersonate the legitimate sender, and then place the authentication device back. Additionally, such hardware authentication devices are cumbersome to integrate in a system and accordingly may make a final product including them more expensive due to the additional hardware required.

To provide additional data source integrity assurance, the present disclosure provides for a system, method, and apparatus that send data with a checksum of the data encrypted by a trusted platform module ("TPM") in order to allow a receiving device to verify the source of the data and that the data has not been altered. In some instances, the data may be sent with a checksum of the data cryptographically signed by the TPM. The present disclosure also provides for a system, method, and apparatus for verifying the integrity of a data source and of the received data itself by decrypting an encrypted checksum received with the content data and comparing the received checksum with a generated checksum of the content data. In the instances in which the checksum is cryptographically signed, the source and data integrity may be verified by cryptographically signing a generated checksum of the content data and comparing the signature with the received signature of the cryptographically signed checksum.

As used throughout this disclosure, a TPM refers to a microchip soldered on the motherboard of, or integrally fabricated in, a computing device that communicates with the remainder of the computing device by using a hardware bus. A TPM is a passive component and only responds to requests from a processor. A TPM uses its own internal firmware and logic circuits to process instructions and thus does not rely on the operating system of the computing device aside from receiving instructions and providing outputs. Further, the TPM is programmed to only execute certain actions, and thus will not execute requests that it is not programmed to execute. For instance, the TPM is programmed to not share certain cryptographic keys that it stores or generates and thus is unable to share them even if requested by the processor. Accordingly, a TPM includes memory that is not controlled by, and is logically isolated from, the operating system. The TPM stores private portions of cryptographic keys it generates within such logically isolated memory. Therefore, any such keys are logically isolated from the computing device's other components, such as the processor, and are not exposed to vulnerabilities that might exist in the operating system or application software.

A TPM is shipped in many modern systems, such as smartphones and laptops, and is integrated in these systems upon manufacture such that the TPM is not readily removable. A TPM is thus readily available for use in many modern systems and is also certified for more uses than hardware authentication devices. Computing devices that incorporate a TPM can create cryptographic keys and encrypt them so that they can only be decrypted by the TPM. This process, often called wrapping or binding a key, can help protect the key from disclosure. Each TPM has its own master wrapping key (e.g., parent key), typically called the storage root key, which is stored within the TPM itself. The TPM is designed such that the private portion of a storage root key and of an endorsement key (described in more detail below) that is created in a TPM is never exposed to any other component, software, process, or user. Similarly, the TPM is designed such that a private key it creates is never exposed to any other component, software, process, or user. Rather, only a private key encrypted by the master wrapping key is exposed outside the TPM. The master wrapping key is then the only key that can decrypt the encrypted private key, and the master wrapping key always remains stored within the TPM, so the encrypted private key may only be decrypted within the TPM.

In addition to creating cryptographic keys, the TPM may also cryptographically sign and encrypt data, for instance, with the keys it creates. Data and a key may be provided to the TPM for signing or encryption and the TPM then provides the signed or encrypted data. In many instances, data will be provided to the TPM with a private key encrypted by the TPM. The TPM thus decrypts the encrypted private key, signs or encrypts the data with the decrypted private key, and provides the signed or encrypted data. The private key is either discarded or encrypted again by the TPM so that the private key is never in a decrypted form outside of the TPM.

Another feature of a TPM is that reinitializing the TPM discards the master wrapping key and generates a new master wrapping key. Therefore, anything that was encrypted by the discarded master wrapping key can no longer be decrypted after a TPM is reinitialized, and anything signed by the reinitialized TPM will have a different signature than the TPM would have produced prior to reinitialization. Further, physically removing a TPM from the circuit board it is integrated with, such as de-soldering the TPM from the board, causes the TPM to be reinitialized. Physically removing the TPM from the circuit board may also cause damage to the rest of the computer system. Thus, a dishonest party cannot de-solder a TPM from a user device circuit board, integrate it with the dishonest party's device, and impersonate the user device's signature. The TPM would reinitialize and the dishonest party's device would apply cryptographic signatures that are different than the signatures sent by the user device.

A TPM also includes a unique endorsement key pair that is used to identify the TPM. The private endorsement key is embedded within the TPM upon manufacture and always remains stored within the TPM. The public endorsement key is contained in a certificate and is only used in a limited number of procedures to protect user privacy. Instead, aliases to the public endorsement key generated within the TPM are used for routine transactions (e.g., attestation identity keys) to maintain anonymity between different parties that require proof of identity.

Therefore, the TPM in the presently disclosed system creates an asymmetric key pair including a private key and a public key and encrypts the private key with a parent key stored in the TPM. The parent key always remains stored within the portion of the TPM's memory that is logically isolated from the processor in the system, as described above, so it is not vulnerable to software-based attacks attempting to steal the parent key. Physically removing the TPM from a system's circuit board causes the TPM to discard the existing parent key and generate a new parent key. Thus, the only way to decrypt the encrypted private key is with the system that includes the specific TPM that stores the parent key which encrypted the private key. The TPM provides the encrypted private key and the public key to a processor in the system, which stores the encrypted private key in the system's memory and sends the public key either to a public key database or to a specific party. When the processor produces content data (e.g., a picture, video, and/or sensor data), the processor generates a checksum of the content data and sends the checksum and the encrypted private key to the TPM.

The TPM decrypts the encrypted private key with the parent key and encrypts the checksum with the private key. When the private key is decrypted within the TPM, it is stored in volatile memory and is logically isolated from the processor in the system, as described above. After being used to encrypt or sign the checksum, the private key is either discarded or is encrypted by the parent key and provided to a system component for storage. The private key always remains stored within the TPM in decrypted form. Accordingly, the private key is not vulnerable to software-based attacks attempting to steal the private key because a dishonest party obtains no benefit by stealing an encrypted private key they are unable to decrypt, and a decrypted private key within the TPM is logically isolated from the operating system. Therefore, a dishonest actor or otherwise is unable to imitate the cryptographic signature of, or encryption of data by, a private key created by the TPM. The dishonest actor would need physical control of the system that includes the TPM in order to cryptographically sign or encrypt data identically to the TPM. In this way, the presently disclosed system provides cryptographic signatures and encrypted checksums of data that cannot be imitated, thus ensuring that the cryptographically signed data and/or encrypted checksums originated from the system.

After the TPM cryptographically signs or encrypts the checksum with the private key, the TPM provides the signed or encrypted checksum to the processor. The processor then transmits the content data together with the signed or encrypted checksum to an external device (e.g., via a network). In instances in which the transmitted checksum is encrypted, the external device requests the above-mentioned public key from the public key database and decrypts the encrypted checksum with the public key. If the public key successfully decrypts the signed checksum, then it is accordingly verified that the encrypted checksum originated from the device that includes the TPM. If the public key does not decrypt the signed checksum, then this is an indication that the checksum was encrypted by a different device, such as a dishonest actor.

The external device generates a checksum of the content data and compares it to the decrypted checksum. If the checksums match, then it is verified that the content data is the same content data that the device with the TPM transmitted, and has not been altered. If the checksums do not match, this is an indication that the content data has been altered after the TPM encrypted the checksum of the content data. As discussed above, a dishonest actor cannot imitate the encryption by the TPM and thus cannot encrypt a checksum such that the public key decrypts it. Therefore, if a dishonest actor were to alter content data, generate a new checksum, and encrypt the new checksum, the public key would not decrypt the new encrypted checksum, thus indicating that the content data has been altered.

Alternatively, in instances in which the transmitted checksum is cryptographically signed, the external device requests the public key and generates a checksum of the received content data. The external device then verifies the cryptographic signature using the public key and the generated checksum. If the signature is verified, then it is verified that the device with the TPM that generated the private key corresponding to the public key is the device that signed the checksum. It is also verified that the content data has not been altered because the cryptographic signature would not be verified if the generated checksum is different than the checksum cryptographically signed by the TPM.

Accordingly, the present disclosure provides a system, method, and apparatus that helps ensure the integrity of received content data by providing checksums encrypted by a TPM-generated private key with transmitted content data. Dishonest actors are unable to impersonate the encryption of the provided checksums and thus are unable to impersonate the presently disclosed system and apparatus that transmits content data. Receiving parties may therefore verify the content data's source, which also may verify the integrity of the content data unless a dishonest actor had access to the device that includes the TPM.

FIG. 1 illustrates an example system 10 for data integrity assurance, according to an aspect of the present disclosure. The example system 10 includes a provider system 100 in communication with a receiver system 200 over a network 180. The network 180 can include, for example, the Internet or some other data network, including, but not limited to, any suitable wide area network or local area network. In some instances, the provider system 100 may be directly connected to the receiver system 200 rather than over the network 180. The provider system 100 and the receiver system 200 are additionally each in communication with a public key database 160, such as over the network 180. The public key database 160 is a repository for cryptographic public keys that correspond to respective private keys on various devices. As will be described in more detail below, the provider system 100 may send a public key to the public key database 160 and the receiver system 200 may subsequently request the public key from the public key database 160 in order to decrypt the encrypted checksum provided by the provider system 200.

In various aspects of the present disclosure, the provider system 100 generates content data 114 that includes media. For example, the provider system 100 may generate one or more pictures, videos, audio recordings, or other media, with a camera, microphone, recorder, etc. In another example, the provider system 100 may generate content data 114 that includes sensor data as detected by a sensor, such as various environmental conditions or other suitable parameters. The provider system 100, after generating the content data 114, generates and, in some examples, encrypts a checksum of the content data 114, and then sends the content data 114 with the encrypted checksum 124 to the receiver system 200. In other examples, the provider system 100 may cryptographically sign the checksum. This will be described in more detail below. In other aspects of the present disclosure, the provider system 100 may additionally or alternatively receive media from a media device 170 (e.g., over the network 180) or sensor data from a sensor 150 (e.g., over the network 180). In such aspects, the provider system 100 processes the received content data 114 the same as the content data 114 generated by the provider system 100.

FIG. 1 further illustrates a box diagram of an example provider system 100, according to an aspect of the present disclosure. In other examples, the components of the provider system 100 may be combined, rearranged, removed, or provided on a separate device or server. The example provider system 100 may include a processor, a memory 104 storing instructions, and a trusted platform module 140. The processor may be a CPU 102, a GPU, an ASIC, a FPGA, a DSP or any other similar device. The example provider system 100 may include one or more media capture devices 112, one or more sensors 106, and a content module 110. The one or more media capture devices 112 may be, for example, a camera configured to capture pictures and/or videos or a microphone configured to record audio. The one or more media devices 112 may capture media (e.g., multimedia) and provide the content data 114 (e.g., the media data file) to the content module 110. As discussed above, the media and corresponding content data 114 may be a picture file, a video file with audio, a video file without audio, an audio file, or any other suitable media file.

The one or more sensors 106 of the example provider system 100 may be any suitable sensor configured to capture data and provide the data to the content module 110. For example, the one or more sensors 106 may be a temperature sensor, a humidity sensor, a gas sensor, a pressure sensor, a chemical sensor, a fluid level sensor, a water quality sensor, a smoke sensor, a movement sensor, a proximity sensor, an acceleration sensor, a gyroscope sensor, an infrared sensor, an optical sensor, and/or an image sensor. The content data 114, thus, may also include data captured by the one or more sensors 106.

The content module 110 of the example provider system 100 may be programmed to receive content data 114, such as media files including pixels and/or audio or files including raw data captured by a sensor. In some instances, the content module 110 is programmed to receive the content data 114 over circuitry from a hardware component in the same system, such as camera or sensor. Additionally or alternatively, in some instances, the content module 110 may be programmed to receive the content data 114 over a network (e.g., the Internet) from an external device.

In some examples, the content module 110 is programmed to process the content data 114 and to execute an action corresponding to the processing. For instance, in some examples, the provider system 100 may include a display 108 for viewing media and/or sensor data. In such examples, the content module 110 may process the received content data 114 and cause a video, picture, sensor data, etc. to be displayed on the display 108. The display 108 may be any suitable display for presenting information and may be a touch display. The content module 110 may also be programmed to transmit data over a network (e.g., the Internet). For example, the content module 110 may be programmed to transmit content data 114, such as a video file or sensor data, together with an encrypted checksum 124 of the content data 114 to an external device over a network (e.g., the Internet).

The provider system 100 may be programmed to capture sensor data in a variety of instances in which the integrity of the sensor data is important to the operation of the provider system 100 or to the operation of a larger system of which the provider system 100 is a part. For example, self-driving cars utilize a variety of sensors (e.g., proximity sensors, acceleration sensors, pressure sensors, etc.) that capture data on the self-driving car's operation and surrounding environment. In many instances, a processor on board the self-driving car will process the data received from the sensors and accordingly transmit commands to various car components (e.g., the brakes or steering wheel). In some instances, a self-driving car may communicate at least some of that data to another entity, such as a server, which processes the data and outputs signals to the self-driving car. If the captured sensor data were to be compromised prior to being processed by the on-board processor (or server), unintended commands may be sent to the self-driving car's components based on false sensor data. Accordingly, it is imperative that the on-board processor is able to verify that the received data came from the self-driving car's sensors and has not been altered.

As described above, in some examples of the present disclosure, the content module 110 of the provider system 100 may receive sensor data or media over the network 180 from a sensor 150 or media device 170, respectively. In such examples, the provider system 100 might not have a media capture device 112 and/or a sensor 106 and may only receive media and/or sensor data from external sources. Such examples of the system 10 provide a lower level of security than examples of the system 10 in which the provider system 100 generates its own media and/or sensor data; however, this level of security may be sufficient in various instances. For example, the security level is lower because the media and/or sensor data may have been altered prior to being sent to the provider system 100. Accordingly, such an example system 10 is unable to provide assurance that the media and/or sensor data has not been altered from its originating source. However, such an example system 10 is able to provide assurance that the media and/or sensor data has not been altered since it has left the provider system 100. In some applications of the system 10, this may be a sufficient amount of assurance regarding the integrity of the media and/or sensor data.

The example provider system 100 also includes a checksum generator 120 programmed to generate a checksum 122 of data. For instance, after receiving content data 114, the content module 110 may send the content data 114 to the checksum generator 120 for the checksum generator 120 to generate a checksum 122 of the content data 114.

The example provider system 100 further includes a trusted platform module 140 integrated with the circuit board of the provider system 100. The trusted platform module 140 is a microchip configured according to the preceding description regarding TPMs. The trusted platform module 140 therefore uses its own internal firmware and logic circuits to process instructions and thus does not rely on the operating system of the provider system 100. Accordingly, the trusted platform module 140 is not exposed to vulnerabilities that might exist in the operating system or application software of the provider system 100. The trusted platform module 140 stores a parent key 142 (e.g., a master wrapping key) that always remains stored within the trusted platform module 140. The parent key 142 is physically built into the trusted platform module 140 upon manufacture of the trusted platform module 140 and is logically isolated from all other components of the provider system 100, including the CPU 102. The parent key 142, therefore, may be inseparable from the trusted platform module 140.

For instance, the trusted platform module 140 is programmed to only execute certain actions, and thus will not execute requests that it is not programed to execute. In one example, the trusted platform module 140 is programmed to not share its parent key 142 that it stores and thus is unable to share the parent key 142 even if requested by the CPU 102.

The trusted platform module 140 is further programmed to discard the parent key 142 and generate a new parent key if the trusted platform module 140 is reinitialized. For example, the trusted platform module 140 may discard the parent key 142 by overwriting it (e.g., with newly generated parent key). Additionally, if the trusted platform module 140 is removed from the circuit board of the provider system 100, such as by de-soldering the trusted platform module 140 from the circuit board, the trusted platform module 140 is programmed to automatically reinitialize. Thus, if the trusted platform module 140 is removed from the circuit board, a new parent key 142 will be generated.

The example trusted platform module 140 further stores an endorsement key 144 that always remains stored within the trusted platform module 140. For instance, the endorsement key 144 is a private key that is embedded within the trusted platform module 140 upon manufacture and is used to identify the trusted platform module 140. The endorsement key 144 belongs to an asymmetric key pair that also includes an endorsement public key 162. The endorsement public key 162 may be contained in a certificate and/or may be stored in a public key database 160.

The example trusted platform module 140 may also generate asymmetric key pairs including a private key 146 and a public key 234. The trusted platform module 140 encrypts the private key 146 with the parent key 142, and provides the encrypted private key 134 and public key 234 to the key module 130. The key module 130 may be programmed to send the public key 234 to the public key database 160 (e.g., over the network 180). In some instances, the key module 130 may be programmed to store the encrypted private key 134. In other instances, the encrypted private key 134 may be stored in another component of the provider system 100, such as the memory 104. In some examples, the key module 130 is programmed to request the trusted platform module 140 to cryptographically sign or encrypt data, which includes the key module 130 loading an encrypted private key 134 into the trusted platform module 140. In such examples, the key module 130 may receive the encrypted or signed data and may be programmed to transmit the encrypted or signed data to an external device or may be programmed to provide the encrypted or signed data to another system component for it to transmit the data, such as the content module 110.

The trusted platform module 140 is also programmed to decrypt the encrypted private key 134 with the parent key 142 to obtain the private key 146 when the encrypted private key 134 is loaded into the trusted platform module 140. When the trusted platform module 140 decrypts the encrypted private key 134, the private key 146 is logically isolated within the trusted platform module 140 from all other components of the provider system 100, including the CPU 102. The trusted platform module 140 may cryptographically sign or encrypt data provided to the trusted platform module 140 with the private key 146 when it is loaded into the trusted platform module 140, but it may disallow the private key 146 from being sent outside of the trusted platform module 140. For instance, the trusted platform module 140 is programmed to only execute certain actions, and thus will not execute requests that it is not programed to execute. In one example, the trusted platform module 140 is programmed to not share a private key 146 that it generates or decrypts and thus is unable to share the private key 146 even if requested by the CPU 102.

Rather, the trusted platform module 140 is configured to discard the private key 146 at some point after signing and/or encryption and/or to encrypt the private key 146 with the parent key and provide the encrypted private key 134. For example, the trusted platform module 140 stores the private key 146 in volatile memory and thus loses the private key 146 when the power supply to the provider system 100 is interrupted given the nature of volatile memory. In such an example, the trusted platform module 140 may store the private key 146 within its volatile memory until the provider system 100 is turned off or restarted, or may encrypt the private key 146 and provide the encrypted private key 134 to the processor (e.g., the key module 130) for storage in non-volatile memory. In another example, the trusted platform module 140 may discard the private key 146 by overwriting it with other data, such as a different decrypted private key.

The example provider system 100 is programmed to generate and/or receive content data 114, generate a checksum 122 of the content data 114, encrypt the checksum 122 via the trusted platform module 140 using a private key 146 generated by the trusted platform module 140, and send the content data 114 together with the encrypted checksum 124 to a receiver system 200. The receiver system 200 may decrypt the encrypted checksum 124 with the public key 234 corresponding to the private key 146 that encrypted the checksum 124. In some instances, the provider system 100 may be programmed to send the content data 114 and encrypted checksum 124 near simultaneously with generating or receiving the content data 114. For example, the provider system 100 may send a picture immediately after capturing it (e.g., to cloud storage), or may be generating a live stream (e.g., Facebook® Live). In such instances, content is received, a checksum is generated and encrypted, and the content is sent with the encrypted checksum all in a matter of a few seconds or fractions of seconds. Various aspects of the present disclosure may contribute to the concurrency or latency of this process as described in the following examples.

As stated in the preceding description, in some examples of the present disclosure, the content data 114 generated or received by the provider system 100 may be video. Video data may include a series of sequential frames. Accordingly, in some aspects of the present disclosure, the provider system 100 is programmed to generate and encrypt a checksum 122 for each frame in the video, and send each frame with its respective encrypted checksum 124 to the receiver system 200. In some instances, the provider system 100 generates and encrypts a checksum 122 for each frame of a group of frames, and then sends all of the frames in the group of frames with their respective encrypted checksums 124 together at once. In other instances, such as a live stream example, the provider system 100 sends each frame with its respective encrypted checksum 124 near simultaneously with receiving each frame. In other words, the provider system 100 processes and sends each frame on a rolling basis as the provider system 100 receives it, rather than processing an entire video file prior to sending the whole video file.

Additionally or alternatively, in some aspects of the present disclosure, the provider system 100 is programmed to generate and encrypt a checksum 122 for sets of frames, rather than each frame. For instance, the provider system 100 may receive two frames, generate a single checksum 124 for the two frames, receive the next two frames, and generate a single checksum 122 for the next two frames, and so forth. The sets of frames may also be larger than two frames (e.g., 3, 4, 5, 8, 15, 30, 60, 120). Again, as described above, in some instances the provider system 100 generates and encrypts a checksum 122 for every set of frames, and then sends all of the sets of frames with their respective encrypted checksums 124 together at once. In other instances, such as the live stream example, the provider system 100 sends each set of frames with its respective encrypted checksum 124 near simultaneously with receiving each set of frames. In other words, the provider system 100 processes and sends each set of frames as the provider system 100 receives them, rather than processing an entire video file prior to sending the whole video file.

Additionally or alternatively, in some aspects of the present disclosure, the provider system 100 is programmed to generate and encrypt a checksum 122 for only a portion of the frames in a video. For instance, the provider system 100 may receive a sequence of frames and may only generate a checksum 122 for every other frame, or may only generate a checksum 122 for every third frame, etc. Thus, for the frames that do not have a checksum 122 generated, the provider system 100 sends those frames without an encrypted checksum 124.

This aspect of the present disclosure provides less assurance of the integrity of the content data 114 than the aspects in which a checksum 122 is generated for every frame; however, it may help with processing speed. For instance, the increased processing speed may help with live-stream examples as described above. Accordingly, this aspect may be preferred in certain instances in which less assurance is tolerated. Additionally, in some instances the provider system 100 generates and encrypts a checksum 122 for each of the specific frames among the sequence, and then sends all of the frames, some with their respective encrypted checksums 124, together at once. In other instances, such as the live stream example, the provider system 100 sends each frame near simultaneously with receiving it, with some of the frames being sent with encrypted checksums 124. In other words, the provider system 100 processes and sends each frame as the provider system 100 receives it, rather than processing an entire video file prior to sending the whole video file.

As described above, in some aspects of the present disclosure, the provider system 100 may continually receive a portion of data and send it with an encrypted checksum 124. In such aspects, the provider system 100 may provide a different encrypted private key 134 to the trusted platform module 140 for encrypting each respective checksum 122 in some instances. However, in other instances, the provider system 100 may provide a single encrypted private key 134 to the trusted platform module 140, which decrypts the encrypted private key 134 and stores the private key 146 in volatile memory to encrypt each checksum 122 that is provided to the trusted platform module 140. Thus, as each portion of data is sequentially sent to the trusted platform module 140, each portion of data is encrypted with the same private key 146. This saves the provider system 100 from having to store a plethora of keys for encrypting and increases processing speed over aspects that provide a key for each checksum because the trusted platform module is only required to decrypt one key. In some instances, the provider system 100 and/or the trusted platform module 140 may be programmed such that the trusted platform module 140 encrypts a certain number of checksums 122 with a private key 146 before needing a new private key 146. For example, the trusted platform module 140 may only be able to encrypt twenty checksums 122 with a single private key 146 and then needs a new private key 146 to continue encrypting.

Although the provider system 100 is described above as being programmed to encrypt the generated checksum 122 via the trusted platform module 140, in some examples, the provider system 100 may cryptographically sign the generated checksum 122 via the trusted platform module 140. For instance, the trusted platform module 140 may apply a cryptographic signature derived from the private key 146 to the checksum 122 using a one-way signature scheme (e.g., a Lamport signature scheme) such that once signed, a receiving party cannot obtain the checksum 122 from the signature, but can merely verify the signature. In such examples, the encrypted checksum 124 provides a cryptographic signature derived from the private key 146 instead of the checksum 122 encrypted by the private key 146. In such examples, the provider system 100 sends the content data 114 together with the cryptographic signature to an external device (e.g., the receiver system 200).

FIG. 1 further illustrates a box diagram of an example receiver system 200, according to an aspect of the present disclosure. In other examples, the components of the receiver system 200 may be combined, rearranged, removed, or provided on a separate device or server. The example receiver system 200 may include a processor in communication with a memory 204 storing instructions. The processor may be a CPU 202, a GPU, an ASIC, a FPGA, a DSP or any other similar device. The example receiver system 200 may include a content module 210 programmed to receive content data 114, such as media files including pixels and/or audio or files including raw data captured by a sensor. In some instances, the content module 210 is programmed to receive the content data 114 over circuitry from another component in a system. Additionally or alternatively, in some instances, the content module 210 may be programmed to receive the content data 114 over a network (e.g., the Internet) from an external device, such as a provider system 100.

In some instances, the content module 210 may be programmed to process the content data 114 and to execute an action corresponding to the processing. For example, the content module 210 may process a picture data file or a video data file to cause it to be displayed on the display 208 of the receiver system 200. The display 208 may be any suitable display for presenting information and may be a touch display. In other examples, the content module 210 may process sensor data and, as a result of that processing, issue a request and/or command over circuitry so that a component external to the receiver system 200 executes an action. It should be appreciated that in such other examples the receiver system 200 might not have a display 208, or it may have a display 208 such that the incoming sensor data may be viewed.

The content module 210 may be programmed to transmit data over a network (e.g., the Internet). For example, the content module 210 may be programmed to transmit content data 114, such as a video file or sensor data, to an external device over a network (e.g., the Internet).

The example receiver system 200 also includes a checksum generator 220 programmed to generate a checksum 222 of content data 114. For instance, after receiving content data 114, the content module 210 may send the content data 114 to the checksum generator 220 for the checksum generator 220 to generate a checksum 222 of the content data 114. The checksum generator 220 may also be programmed to compare a generated checksum 222 with a received checksum (e.g., checksum 122), which will be described in more detail below.

The receiver system 200 also includes a key module 230 programmed to request and receive a cryptographic key from a public key database 160, for example, the public key 234. The key module 230 may also be programmed to verify cryptographic signatures and to decrypt encrypted data. For example, if the receiver system 200 receives content data 114 with an encrypted checksum 124 from the provider system 100, the content module may receive the content data 114 and the key module 230 may receive the encrypted checksum 124. The key module 230 may request the public key 234 from the public key database 160 and may decrypt the encrypted checksum 124 with the public key 234. If the decryption is successful, it is confirmed that the TPM (e.g., the trusted platform module 140) that generated the public key 234 was the encrypting entity, rather than a dishonest actor who intercepted the content data 114 transmission and encrypted the content data 114 in an attempt to impersonate the content data 114 provider.

Continuing with the example, the content module 210 may provide the content data 114 to the checksum generator 220, which may generate a checksum 222 of the content data 114. The key module 230 may provide the decrypted checksum 122 to the checksum generator 220, which may compare the received decrypted checksum 122 with the generated checksum 222. If the checksum 122 matches the checksum 222, then it is verified that the content data 114 has not been altered. Accordingly, the receiver system 200 may be programmed to execute processing corresponding to the content data 114, such as displaying a video on the display 208. In some aspects, the receiver system 200 executes the processing corresponding to the content data 114 as soon as it receives the content data 114 and verifies the integrity of the content data 114 at a subsequent time, or only if prompted by an end user. In other aspects, the receiver system 200 abstains from executing the processing unless and until the content data 114 is verified. In other aspects, the receiver system 200 may execute the processing if prompted by the end user in spite of the fact that the integrity of the content data 114 appears to be compromised.

If the checksums 122 and 222 do not match, then this is an indication that the content data 114 has been altered since it was sent by the provider system 100. Accordingly, the receiver system 200 may be programmed to alert the end user (e.g., on the display 208) that the content data 114 has been altered and/or corrupted. In some instances, the receiver system 200 may also be programmed to alert the provider system 100 and/or request the provider system 100 to resend the content data 114.

Although the receiver system 200 is described above as programmed to decrypt the encrypted checksum 124 and compare the received checksum 122 with the generated checksum 222, in some examples, the receiver system 200 may be programmed to verify a received cryptographic signature provided by the encrypted checksum 124. In such examples, the cryptographic signature is a cryptographic signature of the checksum 122. In such examples in which the encrypted checksum 124 provides a cryptographic signature, the receiver system 200 requests the public key 234 and generates a checksum 222 of the received content data 114. The receiver system 200 then verifies the cryptographic signature provided by the encrypted checksum 124 using the public key 234 and the generated checksum 222. If the signature is verified, then it is verified that the device with the trusted platform module 140 that generated the private key 146 corresponding to the public key 234 is the device that cryptographically signed the checksum 122. It is also verified that the content data 114 has not been altered because the cryptographic signature would not be verified if the generated checksum 222 does not match the checksum 122, since the checksum 122 is the data that was cryptographically signed.

Figure 2:
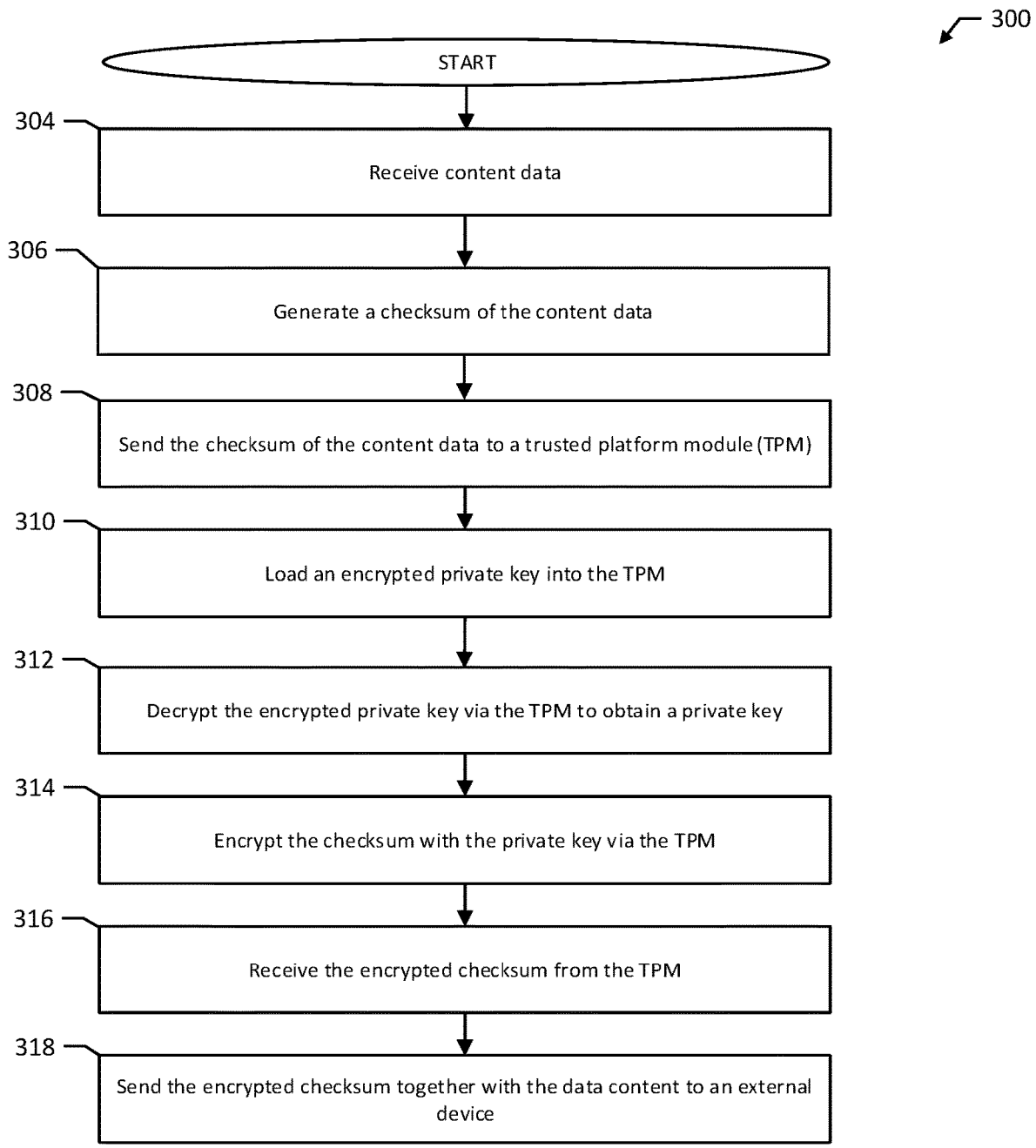
FIG. 2 illustrates a box diagram of an example method for providing content data with a cryptographically signed checksum, according to an aspect of the present disclosure.

FIG. 2 illustrates a box diagram of an example method 300 for providing content data with a cryptographically signed checksum, according to an aspect of the present disclosure. The method 300 may be implemented on a computer system, such as the provider system 100. For example, the method 300 may be implemented by the sensor 106, the display 108, the content module 110, the checksum generator 120, the key module 130, and/or the trusted platform module 140. The method 300 may also be implemented by a set of instructions stored on a computer readable medium that, when executed by a processor, cause the computer system to perform the method. For example, all or part of the method 300 may be implemented by the CPU 102 and the memory 104. Although the examples below are described with reference to the flowchart illustrated in FIG. 2, many other methods of performing the acts associated with FIG. 2 may be used. For example, the order of some of the blocks may be changed, certain blocks may be combined with other blocks, one or more of the blocks may be repeated, and some of the blocks described may be optional.

In one example scenario, a surveillance camera may capture video of a bank lobby and transmit the video to a server for storage. In such a scenario, a dishonest actor may intercept the captured video of a bank robbery, and using Deep Fake technology, make it appear that another person committed the bank robbery. The dishonest actor may then transmit the altered video to the server for storage. The server will treat the altered video the same as a video sent straight from the surveillance camera, and thus those viewing the bank robbery video, such as law enforcement, will have no reason to believe that the video is altered. Conversely, the surveillance camera may implement the example method 300 so that the server may be able to verify that video data it receives came from the surveillance camera.

The example method 300 may begin with receiving content data (block 304). For example, the content module 110 of the provider system 100 may receive content data 114 that includes media through the media capture device 112 or that includes sensor data through the sensor 106. For instance, the provider system 100 may be the surveillance camera that captures video through a lens and processes the video to prepare it for transmittal to a server. In another example, the provider system 100 may receive content data 114 from an external source over a network, such as from the media device 170 and/or the sensor 150 over the network 180. The example method 300 may then include generating a checksum of the content data (block 306). For example, the checksum generator 120 may generate a checksum 122 of the content data 114. For example, the surveillance camera's processor may generate a checksum of the video it captures.

The example method 300 may then include sending the checksum of the content data to a TPM (step 308). For example, the checksum generator 120 may send the checksum of the content data 114 to the trusted platform module 140. For example, the surveillance camera may include a TPM and the surveillance camera's processor may send the generated checksum to the TPM.

The example method 300 may then include loading an encrypted private key into the TPM (block 310). For example, the key module 130 may load the encrypted private key 134 into the trusted platform module 140. The private key in the example method 300 belongs to an asymmetric key pair generated by the TPM which includes the private key and a public key. The private key in the example method 300 was encrypted by the TPM and was provided as an encrypted private key to a processor for it to be stored into memory and loaded into the TPM at a later time. For example, the trusted platform module 140 may generate an asymmetric key pair including the private key 146 and the public key 234, and may encrypt the private key 146 with the parent key 142. The trusted platform module 140 may then send the encrypted private key 134 to the key module 130 so that the key module 130 at a later time may load the encrypted private key 134 into the trusted platform module 140.

For example, the surveillance camera's TPM may generate an asymmetric key pair and provide an encrypted private key to the surveillance camera's processor for storage in the surveillance camera's memory. The surveillance camera's processor may then load the encrypted private key into the TPM when needed. In some instances, the surveillance camera may additionally or alternatively transmit the encrypted private key for storage on a server or other external device. In such instances, the surveillance camera's processor may request the encrypted private key from the external device in order to load it into the TPM.

The example method 300 may then include decrypting the encrypted private key via the TPM to obtain a private key (block 312). For example, the trusted platform module 140 may decrypt the encrypted private key 134 within the trusted platform module 140 to obtain a private key 146. The private key 146 is stored within volatile memory in the trusted platform module 140 and is thus logically isolated from all other components in the provider system 100, such as the processor, as described above. In the continuing example, the surveillance camera's TPM may decrypt the loaded encrypted private key to obtain the private key that the TPM originally generated. The example method 300 may then include encrypting the checksum with the private key via the TPM (block 314). For example, the trusted platform module 140 may encrypt the checksum 122 using the private key 146 within the trusted platform module 140. For example, the surveillance camera's TPM may encrypt the checksum of the captured robbery video file using the private key. In other examples, the method 300 may include applying a cryptographic signature derived from the private key to the checksum via the TPM. In such examples, the subsequent steps of the method 300 are the same except for a cryptographically signed checksum replacing an encrypted checksum.

The example method 300 may then include receiving the encrypted checksum from the TPM (step 316). For example, the key module 130 may receive the encrypted checksum 124 from the trusted platform module 140. The trusted platform module 140 is a passive component of the provider system 100 and only responds to requests from another system component, such as the key module 130. Thus, in this example, for the provider system 100 to send the encrypted checksum 124, the key module 130 requests the encrypted checksum 124 from the trusted platform module 140. In the continuing example, the surveillance camera's processor may receive the encrypted checksum from the TPM.

The example method 300 may then include sending the encrypted checksum together with the content data to an external device (block 318). For example, the content module 110 of the provider system 100 may send the encrypted checksum 124 together with the content data 114 to the receiver system 200. For example, the surveillance camera's processor may transmit the captured video of the bank robbery together with the encrypted checksum to the server for storage. Accordingly, the server may verify that the video data's source is the surveillance camera, rather than a dishonest actor's computer system, with the encrypted checksum. In particular, the server may decrypt the checksum, generate a checksum of the video data, and compare the decrypted checksum with the generated checksum. Because the checksum is encrypted with a private key that always remains protected within a TPM, or with a TPM-based encryption, a dishonest actor is unable to imitate the encryption with the private key. Therefore, the integrity of the video data's source, the surveillance camera, is assured.

Figure 3:
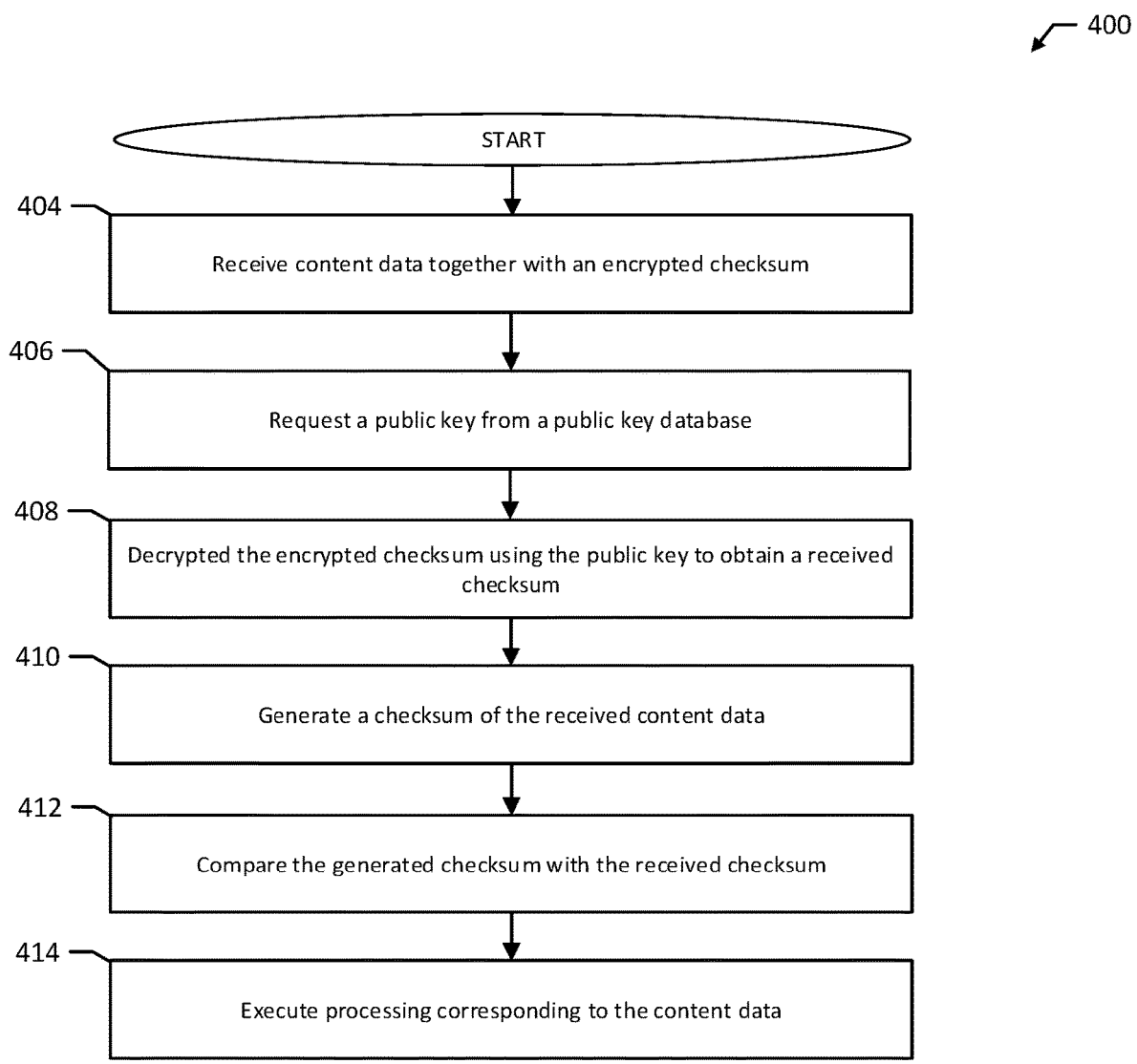
FIG. 3 illustrates a box diagram of an example method for verifying the integrity of content data, according to an aspect of the present disclosure.

FIG. 3 illustrates a box diagram of an example method 400 for verifying the integrity of content data, according to an aspect of the present disclosure. The method 400 may be implemented on a computer system, such as the receiver system 200. For example, the method 400 may be implemented by the display 208, the content module 210, the checksum generator 220, and/or the key module 230. The method 400 may also be implemented by a set of instructions stored on a computer readable medium that, when executed by a processor, cause the computer system to perform the method. For example, all or part of the method 400 may be implemented by the CPU 202 and the memory 204. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

In one example scenario, a surveillance camera may capture video of a bank lobby and transmit the video to a server for storage. In such a scenario, a dishonest actor may intercept the captured video of a bank robbery, and using Deep Fake technology, make it appear that another person committed the bank robbery. The dishonest actor may then transmit the altered video to the server for storage. The server will treat the altered video the same as a video sent straight from the surveillance camera, and thus those viewing the bank robbery video, such as law enforcement, will have no reason to believe that the video is altered. Conversely, when used in connection with a surveillance camera that implements the example method 300 described above, the server may implement the example method 400 so that the server may be able to verify that video data it receives came from the surveillance camera.

The example method 400 may begin by receiving content data together with an encrypted checksum (block 404). For example, the content module 210 of the receiver system 200 may receive content data 114 together with an encrypted checksum 124. For example, the server may receive the robbery video data together with the encrypted checksum of the video data from the surveillance camera.

The example method 400 may then include requesting a public key from a public key database (block 406). For example, when the provider system 100 transmits a public key 234 to a public key database 160, the public key database 160 may generate a certificate (e.g., x509 certificate) that contains the public key 234. The receiver system 200 may accordingly use a filter (e.g., LDAP filter) corresponding to the provider system 100 to query the certificate containing the public key 234 from the public key database 160 (e.g., by the certificate's x509 identity). For instance, a convention may be decided between the provider system 100 and the receiver system 200 so that the receiver system 200 may receive data from the provider system 100 and may know the filter that corresponds to the provider system 100. The public key database 160 may be a certified Certificate Authority and thus the certificates it generates may additionally verify the source of the public key 234 contained in the certificate. For instance, a receiver system 200 may verify that the public key 234 was generated by the provider system 100. Additionally, the public key 234 requested by the receiver system 200 corresponds to the private key 146 that encrypted the received encrypted checksum 124, which was generated by the trusted platform module 140 of the provider system 100.

In the continuing example, the server may request a public key corresponding to the private key that encrypted the checksum from a public key database. In some instances of such an example, where the server is continually in communication with the same surveillance camera, the server may store the public key in its memory and may not need to request it each time the server's processor decrypts an encrypted checksum from the surveillance camera.

The example method 400 may then include decrypting the encrypted checksum using the public key to obtain a received checksum (block 408). For example, the key module 230 of the receiver system 200 may decrypt the encrypted checksum 124 using the public key 234 to obtain the received checksum 122. If the decryption is successful, this verifies that the TPM which generated the public key is the encrypting entity. In the continuing example, the server may decrypt the encrypted checksum received from the surveillance camera using the public key to obtain the received checksum.

The example method 400 may then include generating a checksum of the received content data (block 410). For example, the checksum generator 220 of the receiver system 200 may generate a checksum 222 of the received content data 114. For example, the server's processor may generate a checksum of the received robbery video data. The example method 400 may then include comparing the generated checksum with the received checksum (block 412). For example, the checksum generator 220 of the receiver system 200 may compare the generated checksum 222 with the received checksum 122. For example, the server may compare the checksum it generated with the checksum it received from the surveillance camera. If the generated checksum matches the received checksum, the server verifies that the robbery video data has not be altered from when it was transmitted by the surveillance camera (block 414). If the checksums do not match, this is an indication to the server that the robbery video data has been altered and/or corrupted.

In some aspects, the example method 400 may include verifying a cryptographic signature of the checksum rather than decrypting an encrypted checksum. In such aspects, the example method 400 may include verifying the cryptographic signature with the public key and the generated checksum of the received content data. If the signature is verified, then it is verified that the device with the TPM that generated the private key corresponding to the public key is the device that signed the checksum. It is also verified that the content data has not been altered because the cryptographic signature would not be verified if the generated checksum was different than the checksum cryptographically signed by the TPM.

In some aspects of the present disclosure, the example method 400 may also include providing an alert that the received content data has been altered and/or corrupted upon failing to decrypt the received signed checksum with the public key, or failing to verify the cryptographic signature. For example, the key module 230 of the receiver system 200 may cause an alert to be displayed on the display 208 indicating that the received, encrypted checksum 124 was not successfully decrypted and/or that the received content data 114 may have been altered and/or corrupted. For example, the server may provide an alert on a computer system in communication with the server that data received from the surveillance camera may have been altered and/or corrupted. In another example, the key module 230 may transmit an alert to the provider system 100 that sent the content data 114 indicating that the received, encrypted checksum 124 was not successfully decrypted and/or that the received content data 114 may have been altered and/or corrupted after the provider system 100 sent the content data 114. In some aspects of such an example, the receiver system 200 (e.g., the content module 210) may transmit a request to the provider system 100 for the provider system 100 to send the content data 114 again.

In some aspects of the present disclosure, the example method 400 may include providing an alert that the received content data has been altered and/or corrupted upon determining that the checksums do not match. For example, the key module 230 of the receiver system 200 may cause an alert to be displayed on the display 208 indicating that the checksum 122 and the checksum 222 did not match and/or that the received content data 114 may have been altered and/or corrupted. For example, the server may provide an alert on a computer system in communication with the server that data received from the surveillance camera may have been altered and/or corrupted. In another example, the key module 230 may transmit an alert to the provider system 100 that sent the content data 114 indicating that the checksum 122 and the checksum 222 did not match and/or that the received content data 114 may have been altered and/or corrupted after the provider system 100 sent the content data 114. In some aspects of such an example, the receiver system 200 (e.g., the content module 210) may transmit a request to the provider system 100 for the provider system 100 to send the content data 114 again.

Figure 4:
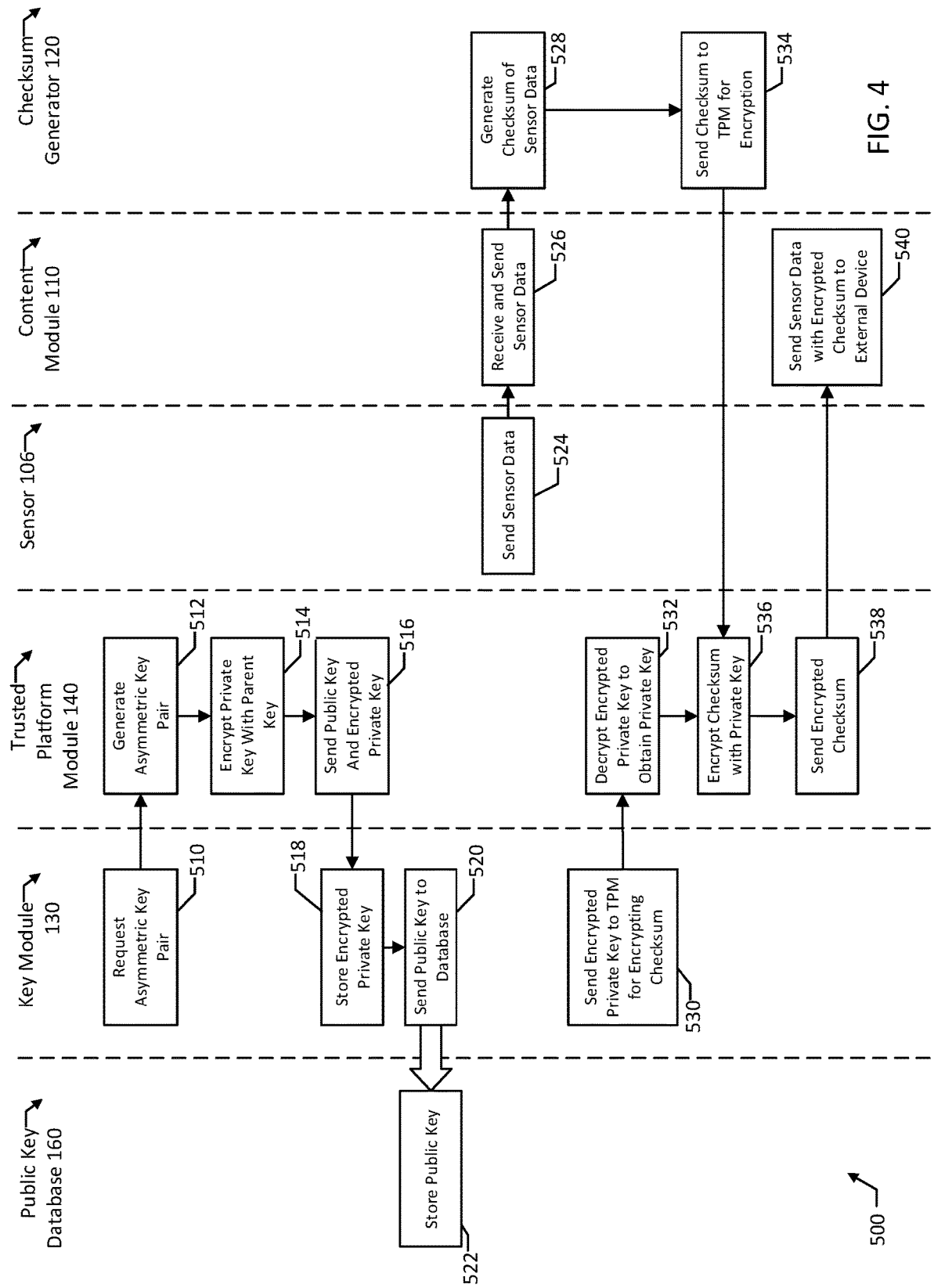
FIG. 4 illustrates an example flow diagram of a method for providing content data with a cryptographically signed checksum, according to an aspect of the present disclosure.

FIG. 4 illustrates a flowchart of an example method 500 for providing sensor data with an encrypted checksum in order to ensure the sensor data's integrity, according to an aspect of the present disclosure. In other examples, the sensor data may be in addition to, or replaced by, media. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional. For example, the CPU 102 and the memory 104 may communicate with a sensor 106, a content module 110, a checksum generator 120, a key module 130, a trusted platform module 140, and a public key database 160 to perform example method 500. The trusted platform module 140 is hardware (e.g., a microchip) integrated with the CPU circuit board.

In one example scenario, a self-driving car may depend on data captured by a variety of sensors that is processed by an on-board controller, which then issues commands to the self-driving car's components based on the processed data. For instance, proximity sensors on the front of a moving self-driving car may detect whether an object (e.g., another car) is within a certain threshold distance to the self-driving car, or how far away the object is, and may transmit such data to the self-driving car's controller. The controller may then process the data, and if an object is too close to the self-driving car, the controller may cause the car's brakes to activate, thus stopping the self-driving car before it hits the object in front of the car. In other instances, a number of other types of sensors similarly provide data to the controller so that the controller may control the self-driving car's functions.

Accordingly, it is imperative that the data coming from the sensors on the self-driving car is not compromised so that the self-driving car may function appropriately. For example, a dishonest actor may attempt to cause a car accident with the self-driving car by either intercepting sensor data and altering it before it reaches the self-driving car's controller and/or transmitting false sensor data to the car's controller. For instance, the dishonest actor may transmit data to the self-driving car's controller indicating that there are no objects getting closer to the car, when in fact there is, thus causing the self-driving car to crash into the object. As a result, the passengers in the self-driving car could be severely injured or even killed. A sensor unit of the self-driving car may implement the example method 500 so that it provides verifiable sensor data to the self-driving car's on-board controller. In such a case, the self-driving car's sensor unit may be configured as a provider system 100 according to the above description.

In the illustrated example method 500, a key module 130 of the self-driving car's sensor unit may request an asymmetric key pair from the sensor unit's trusted platform module 140 (block 510). The sensor unit's trusted platform module 140 is a passive component and only responds to commands from the sensor unit's controller. The trusted platform module 140 processes the commands with its own internal firmware and logic circuits such that data processed and/or stored in the trusted platform module 140 is logically isolated from other components on the circuit board it is integrated with, as described above. The example method 500 may then include the trusted platform module 140 generating an asymmetric key pair including a private key 146 and a corresponding public key 234 (block 512). When generated, the private key 146 and corresponding public key 234 are logically isolated in the trusted platform module 140 from the CPU 102 and other processing components of the self-driving car's circuitry, as described above.

The example method 500 may then include with the trusted platform module 140 encrypting the private key 146 using a parent key 142 stored in the trusted platform module 140 to generate an encrypted private key 134 (block 514). The parent key 142 always remains stored within the sensor unit's trusted platform module 140 and is logically isolated from the CPU 102 and all other processing components of the self-driving car's circuitry, as described above. The example method 500 may then include the trusted platform module 140 sending the requested encrypted private key 134 and the public key 234 to the key module 130 (block 516).

The example method 500 may then include the sensor unit's key module 130 storing the encrypted private key 134 (block 518). In other instances, the key module 130 may send the encrypted private key 134 to another component for storage, such as the sensor unit's memory 104, or to an external device. The example method 500, in some instances, may then include the key module 130 of the sensor unit sending the public key 234 to a public key database 160 (block 520). The public key database 160 may be any suitable repository for storing cryptographic keys, such as a commercial key repository. In other instances, the key module 130 may send the public key 234 to the self-driving car's on-board controller so that the on-board controller may send the public key 234 to the public key database. The example method 500 may then include the public key database 160 storing the public key 134 (block 522).

The example method 500 may then include a sensor 106 of the sensor unit capturing and sending sensor data to the content module 110 of the sensor unit (block 524). For instance, the sensor data may be temperature, humidity, gas, pressure, chemical, fluid level, water quality, smoke, movement, proximity, acceleration, gyroscope data, infrared sensor data, optical, and/or image sensor data. For example, a sensor 106 may be a pressure sensor that measures air pressure in a self-driving car's tires. In another example, a sensor 106 may be a movement sensor that detects when a car in front of a self-driving car moves such that a self-driving car stopped at a stoplight may process that it is time to begin moving again. The example method 500 may then include the content module 110 receiving the sensor data and sending the sensor data to the checksum generator 120 of the sensor unit (block 526).

The example method 500 may then include the checksum generator 120 generating a checksum 122 of the sensor data (block 528). The example method 500 may then include the key module 130 sending the encrypted private key 134 to the sensor unit's trusted platform module 140 for the trusted platform module 140 to encrypt the checksum 122 (block 530). The example method 500 may then include the trusted platform module 140 decrypting the encrypted private key 134 with the parent key 142 to obtain the private key 146 (block 532). When decrypted, the private key 146 is logically isolated within the trusted platform module 140, as described above.

The example method 500 may then include the checksum generator 120 sending the checksum 122 to the trusted platform module 140 for the trusted platform module 140 to encrypt the checksum 122 (block 534). The example method 500 may then include the sensor unit's trusted platform module 140 encrypting the checksum 122 with the private key 146 (block 536). The example method 500 may then include the sensor unit's trusted platform module 140 sending the encrypted checksum 124 to the sensor unit's content module 110 (block 538). Though not illustrated, in some instances, the trusted platform module 140 may discard the private key 146. For example, the private key 146 is stored within volatile memory of the sensor unit's trusted platform module 140, and thus when the self-driving car is shut off, terminating the power supplied to the sensor unit, the trusted platform module's 140 volatile memory loses the private key 146. In other instances, the sensor unit's trusted platform module 140 may encrypt the private key 146 with the parent key 142 and provide the encrypted private key 134 to the key module 130 for storage.

The example method 500 may then include the sensor unit's content module 110 sending the sensor data together with the encrypted checksum 124 to the self-driving car's on-board controller (block 540). The self-driving car's controller may thus be able to verify that the sensor data was provided by the self-driving car's sensor unit, and not by a dishonest actor's computer system, using the encrypted checksum 124. In particular, the self-driving car's controller may decrypt the checksum, generate a checksum of the sensor data, and compare the decrypted checksum with the generated checksum. Because the checksum is encrypted with a private key that always remains protected within the sensor unit's TPM, or with a TPM-based encryption, a dishonest actor is unable to imitate the encryption with the private key. Therefore, the integrity of the sensor data's source, the sensor unit, is assured and the self-driving car's controller can process the sensor data to control the car appropriately.

Figure 5:
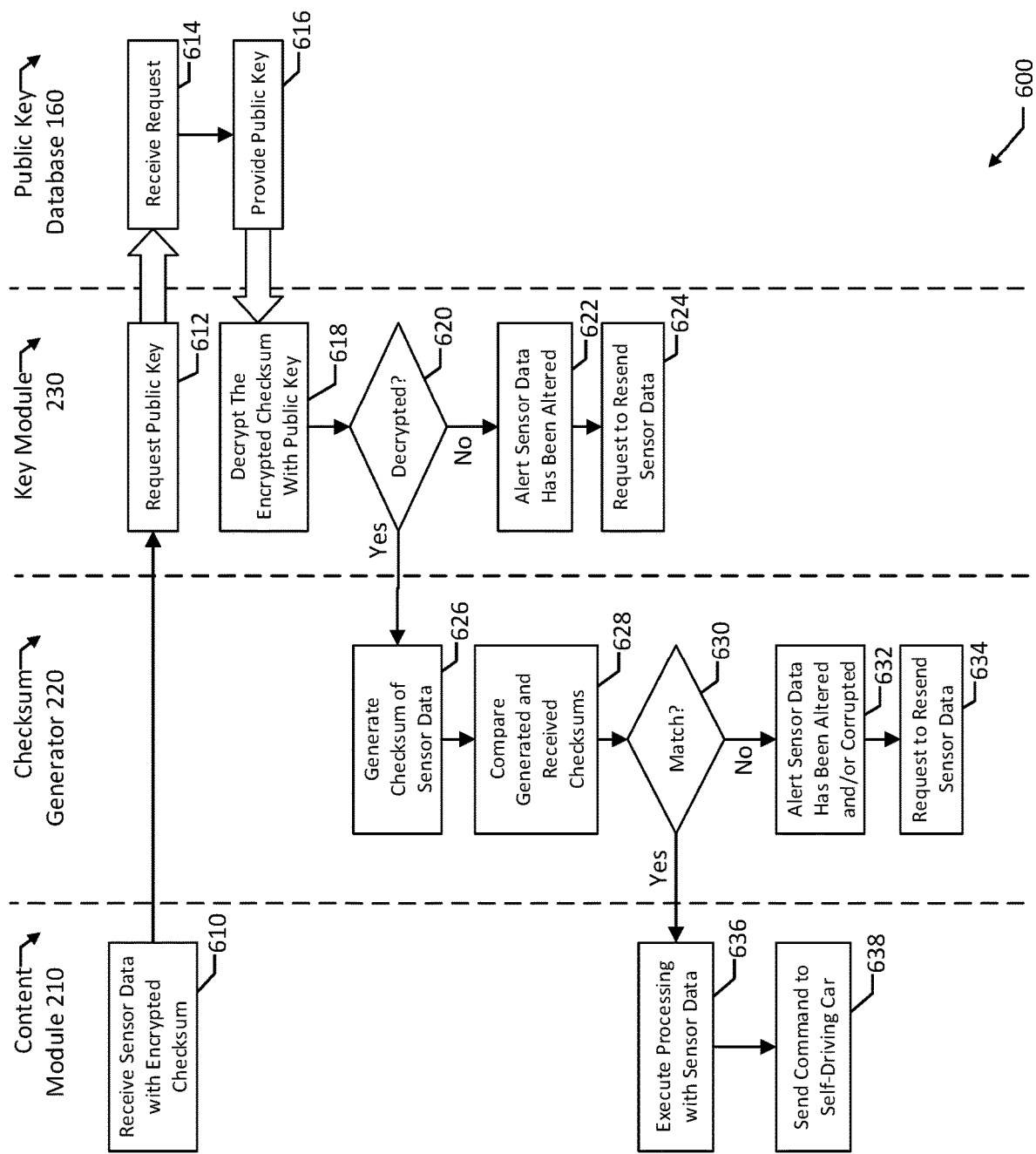
FIG. 5 illustrates an example flow diagram of a method for verifying the integrity of content data, according to an aspect of the present disclosure.

FIG. 5 illustrates a flowchart of an example method 600 for verifying the integrity of content data, according to an aspect of the present disclosure. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional. For example, the CPU 202 and the memory 204 may communicate with a public key database 160, a content module 210, a checksum generator 220, and/or a key module 230 to perform example method 600.

In one example scenario, as described above, a self-driving car may depend on data captured by a variety of sensors that is processed by an on-board controller, which then issues commands to the self-driving car's components based on the processed data. Accordingly, it is imperative that the data coming from the sensors on the self-driving car is not compromised so that the self-driving car may function appropriately. A sensor unit of the self-driving car may implement the example method 500, as described above, so that it provides verifiable sensor data to the self-driving car's on-board controller. In such a case, the self-driving car's controller may be configured according to an example receiver system 200, as described above, and may implement the example method 600 so that the self-driving car's controller may verify that the sensor data it receives is genuine data sent from the self-driving car's sensors.

The example method 600 may include the content module 210 of the self-driving car's on-board controller receiving sensor data together with an encrypted checksum 124 of the sensor data (block 610). In some instances, the content module 210 may communicate with the key module 230 of the on-board controller so that the key module 230 requests the proper public key corresponding to the encrypted checksum 124. In other instances, the content module 210 may send the encrypted checksum 124 to the key module 230 so that the key module 230 may determine the proper public key to request.

The example method 600 may then include the key module 230 requesting the public key 234 corresponding to the encrypted checksum 124 from a public key database 160 (block 612). For example, the key module 230 may use an LDAP filter, corresponding to the self-driving car's sensor unit that sent the data, to query the x509 certificate containing the public key 234 from a Certificate Authority by the certificate's x509 identity. In some instances, the self-driving car's on-board processor may store the public key 234 in memory and thus may not need to request the public key 234 from a public key database 160. In such instances, the key module 230 requests the public key 234 from the memory corresponding to the sensor unit that sent the data to the on-board processor.

The example method 600 may then include the public key database 160 receiving the request from the on-board controller's key module 230 (block 614). The example method 600 may then include the public key database 160 sending the public key 234 to the on-board controller's key module 230 (block 616).

The example method 600 may then include the key module 230 decrypting the encrypted checksum 124 with the public key 234 to obtain the received checksum 122 (block 618). In the example method 600, if the decryption is successful with the public key 234, then it is verified that the encrypted checksum 124 originated from the trusted platform module 140 that generated the public key 234 (block 620). The key module 230 may accordingly provide the decrypted, received checksum 122 to the on-board controller's checksum generator 220. If the decryption is unsuccessful, then this is an indication that another party may have intercepted the sensor data in transit, or transmitted false sensor data to the self-driving car's on-board controller, and provided a checksum encrypted by the other party. An unsuccessful decryption may also indicate that the public key database 160 provided an incorrect public key.

If the public key 234 cannot decrypt the encrypted checksum 124, the on-board controller's key module 230 generates an alert that the sensor data has been altered and/or corrupted (block 622). For instance, the key module 230 of the on-board controller may generate an alert on a display of the self-driving car and/or may transmit an alert to a computing device in communication with the self-driving car. In some examples, this alert could be to notify the passenger in the self-driving car that autopilot is malfunctioning and self-driving by the passenger is required. In some instances, the example method 600 may include the on-board processor's key module 230 requesting the self-driving car's sensor unit to resend the sensor data (block 624).

If the public key 234 successfully decrypts the encrypted checksum 124, the example method 600 may then include the checksum generator 220 of the on-board controller generating a checksum 222 of the sensor data (block 626). The example method 600 may then include the checksum generator 220 comparing the generated checksum 222 with the received and decrypted checksum 122 (block 628). In the example method 600, if the checksum 222 does not match the checksum 122, then this is an indication that the sensor data has been altered and/or corrupted in some way from when the self-driving car encrypted the checksum 122 of the sensor data, but if the checksum 222 does match the checksum 122, then the sensor data's integrity is verified (block 630). The example method 600 may then include, if the checksums do not match, the checksum generator 220 generating an alert that the sensor data has been altered (block 632). For instance, the key module 230 of the on-board controller may generate an alert on a display of the self-driving car and/or may transmit an alert to a computing device in communication with the self-driving car. In some examples, this alert could be to notify the passenger in the self-driving car that autopilot is malfunctioning and self-driving by the passenger is required. In some instances, the example method 600 may include the on-board processor's checksum generator 220 requesting the self-driving car's sensor unit to resend the sensor data (block 634).

The example method 600 may then include, if the checksums match, the on-board controller's content module 210 executing processing with the sensor data (block 636). For example, one or more sensor units of the self-driving car may send sensor data from proximity sensors and/or acceleration sensors. In such an example, the on-board controller's content module 210 may process this sensor data to determine the environment surrounding the self-driving car and how the self-driving car has been operating. The example method 600 may then include the content module 210 of the on-board controller sending a command to a component of the self-driving car based on the processed sensor data (block 638). For example, the content module 210 may send a command to the self-driving car's steering wheel to adjust the steering wheel to the right or left, or may send a command to the self-driving car's drivetrain that adjusts how fast the self-driving car decelerates and/or accelerates.

Accordingly, the self-driving car's on-board controller may implement the example method 600 to verify that the source of the sensor data it receives is one or more of the sensor units on the self-driving car. Because the checksum received by the on-board controller is encrypted with a private key that always remains protected within the sensor unit's TPM, or with a TPM-based encryption, a dishonest actor is unable to steal the private key with software-based attacks. Thus, a dishonest actor is unable to imitate sensor data sent from the sensor unit with software-based attacks. Instead, the dishonest actor would have to somehow physically access and alter the self-driving car's sensor unit, which would require being in the vicinity of the self-driving car, and in many instances would require disassembling portions of the car. The difficulty for a dishonest actor to do so increases the security provided by the example method 600 with regard to the self-driving car's sensor data. Accordingly, the example method 600 provides a secure way for the self-driving car's on-board controller to process received sensor data from the car's sensor units and issue commands to the self-driving car's components so that it functions safely as intended.

Figure 6:
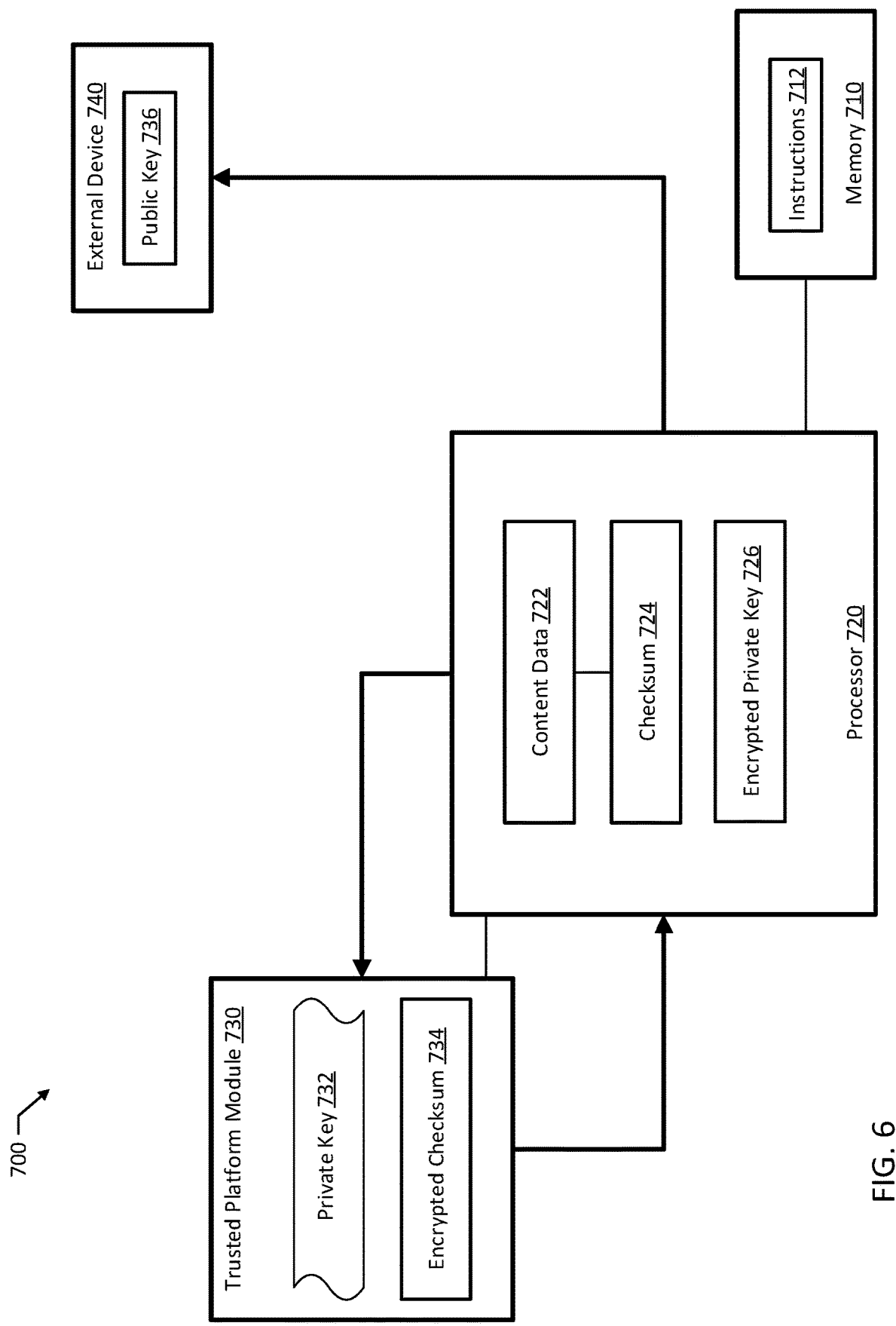
FIG. 6 illustrates an example system for providing verifiable content data, according to an aspect of the present disclosure.

FIG. 6 illustrates a block diagram of an example system for providing verifiable content data, according to an aspect of the present disclosure. System 700 includes a processor 720 in communication with a memory 710 storing instructions 712, and a trusted platform module 730. The instructions 712, when executed by the processor 720, cause the processor 720 to receive content data 722, to generate a checksum 724 of the content data 722, to send the checksum 724 to the trusted platform module 730, and to load an encrypted private key 726 into the trusted platform module 730.

The trusted platform module 730 is configured to decrypt the encrypted private key 726 to obtain a private key 732, and to encrypt the checksum 724 with the private key 732. The instructions 712, when executed by the processor 720, additionally cause the processor 720 to receive the encrypted checksum 734 from the trusted platform module and to send the content data 722 together with the encrypted checksum 734 to an external device 740. The private key 732 belongs to an asymmetric key pair generated by the trusted platform module 730. The asymmetric key pair includes the private key 732 and a public key 736.

By providing the content data 722 with an encrypted checksum 734 that was encrypted by a private key 732 generated by a trusted platform module 730, the system 700 advantageously ensures the integrity of the source of the content data 722. For instance, dishonest actors are unable to impersonate the encryption of the checksum 724 by the trusted platform module 730, as described above. Thus, the external device 740 receiving the content data 722 and the encrypted checksum 734 may verify the source of the content data 722 with the encrypted checksum 734.

Figure 7:
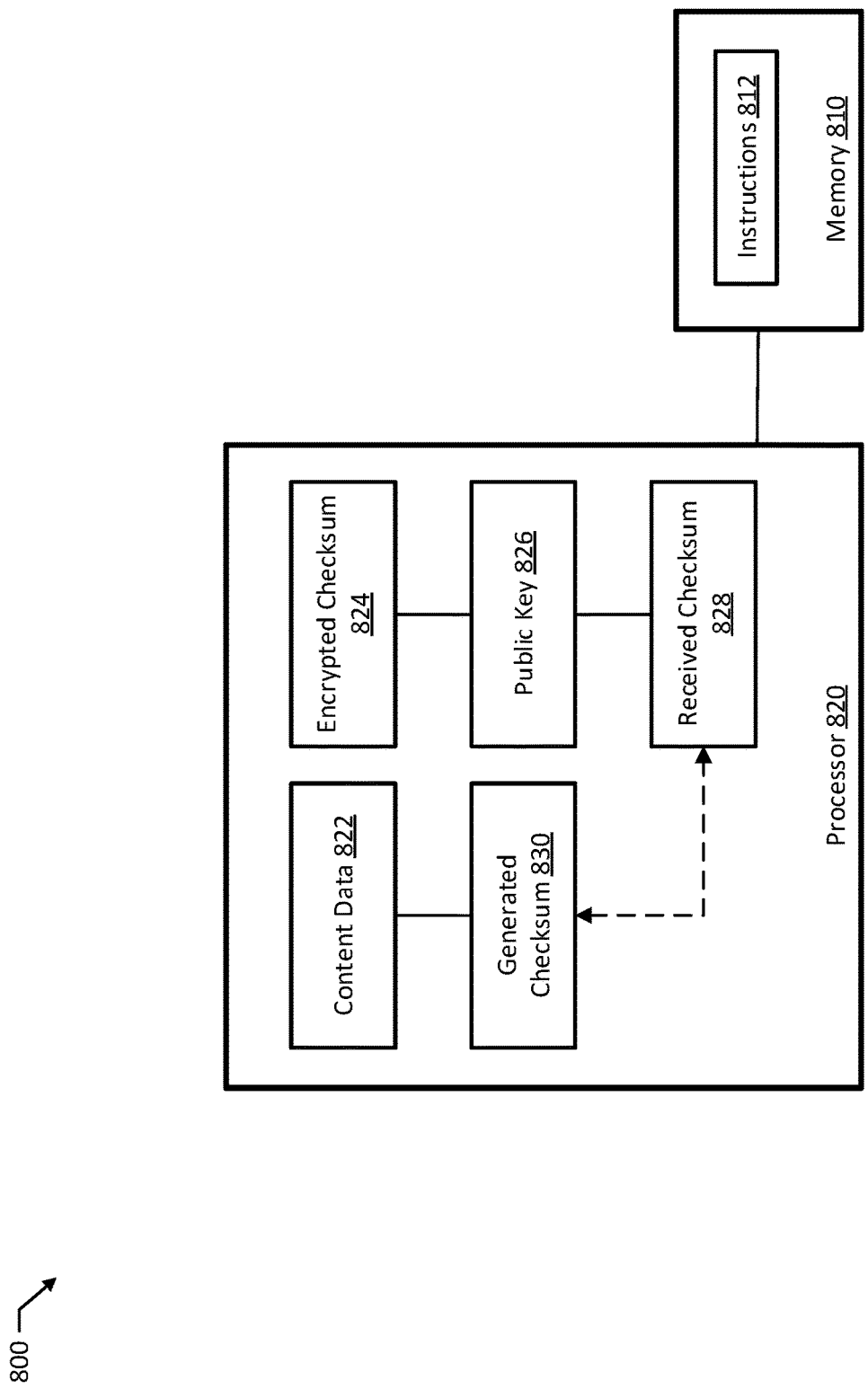
FIG. 7 illustrates an example system for verifying the source of received content data, according to an aspect of the present disclosure.

FIG. 7 illustrates a block diagram of an example system for verifying the source of received content data, according to an aspect of the present disclosure. System 800 includes a processor 820 in communication with a memory 810 storing instructions 812. The instructions 812, when executed by the processor 820, cause the processor 820 to receive content data 822 together with an encrypted checksum 824 of the content data 822. The instructions 812 further cause the processor 820 to decrypt the encrypted checksum 824 using a public key 826 to obtain a received checksum 828. The instructions 812 further cause the processor 820 to generate a checksum 830 of the received content data 822 and to compare the generated checksum 830 with the received checksum 828. Responsive to the generated checksum 830 matching the received checksum 828, the instructions 812 further cause the processor 820 to execute processing corresponding to the content data 822.

By successfully decrypting the encrypted checksum 824 with the public key 826 to obtain the received checksum 828, the system 800 advantageously verifies that the encrypted checksum 824 originated from a system that includes the trusted platform module that encrypted the checksum. By generating a checksum 830 of the received content data 822 and comparing it to the received checksum 828, the system 800 may advantageously verify that the content data 822 has not been altered since the trusted platform module encrypted the checksum.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as GPUs, ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a processor, a trusted platform module, and a memory storing instructions, which when executed by the processor, cause the processor to receive content data, generate a checksum of the content data, send the checksum to the trusted platform module, and load an encrypted private key into the trusted platform module. The trusted platform module is configured to decrypt the encrypted private key to obtain a private key, and to encrypt the checksum with the private key. The instructions further cause the processor to receive the encrypted checksum from the trusted platform module, and send the content data together with the encrypted checksum to an external device. The private key belongs to an asymmetric key pair generated by the trusted platform module. The asymmetric key pair includes the private key and a public key.

In accordance with a 2nd exemplary aspect of the present disclosure, which may be used in combination with any one or more of the preceding aspects (e.g., the 1st aspect), the content data includes sensor data.

In accordance with a 3rd exemplary aspect of the present disclosure, which may be used in combination with any one or more of the preceding aspects (e.g., the 2nd aspect), the sensor data includes one or more of the group consisting of temperature, humidity, gas, pressure, chemical, fluid level, water quality, smoke, movement, proximity, acceleration, gyroscope, infrared, optical, and image.

In accordance with a 4th exemplary aspect of the present disclosure, which may be used in combination with any one or more of the preceding aspects (e.g., the 1st aspect), the content data includes one or more forms of media.

In accordance with a 5th exemplary aspect of the present disclosure, which may be used in combination with any one or more of the preceding aspects (e.g., the 1st aspect), the instructions cause the processor to send the content data with the encrypted checksum near simultaneously with receiving the content data.

In accordance with a 6th exemplary aspect of the present disclosure, which may be used in combination with any one or more of the preceding aspects (e.g., the 5th aspect), the content data includes video data.

In accordance with a 7th exemplary aspect of the present disclosure, which may be used in combination with any one or more of the preceding aspects (e.g., the 6th aspect), the video data includes a plurality of frames including a first set of two or more frames and a second set of two or more frames, and the instructions cause the processor to generate a first checksum for the first set and a second checksum for the second set, wherein the trusted platform module encrypts each of the first and second checksums.

In accordance with a 8th exemplary aspect of the present disclosure, which may be used in combination with any one or more of the preceding aspects (e.g., the 6th aspect), the video data includes a sequence of frames including a first frame, a second frame, and a third frame, and the instructions cause the processor to generate a first checksum for the first frame, skip the second frame, and generate a second checksum for the third frame, wherein the trusted platform module encrypts each the first checksum and the second checksum.

In accordance with a 9th exemplary aspect of the present disclosure, which may be used in combination with any one or more of the preceding aspects (e.g., the 6th aspect), the video data includes a plurality of frames and the instructions cause the processor to generate a respective checksum for each respective frame in the plurality of frames, wherein the trusted platform module encrypts each of the respective checksums.

In accordance with a 10th exemplary aspect of the present disclosure, which may be used in combination with any one or more of the preceding aspects (e.g., the 1st aspect), the trusted platform module encrypts the private key and decrypts the encrypted private key with a parent key stored within the trusted platform module.

In accordance with an 11th exemplary aspect of the present disclosure, which may be used in combination with any one or more of the preceding aspects (e.g., the 10th aspect), the parent key is logically isolated from the processor.

In accordance with a 12th exemplary aspect of the present disclosure, which may be used in combination with any one or more of the preceding aspects (e.g., the 10th aspect), reinitializing the trusted platform module alters the parent key.

In accordance with a 13th exemplary aspect of the present disclosure, which may be used in combination with any one or more of the preceding aspects (e.g., the 1st aspect), after the trusted platform module decrypts the encrypted private key, the private key is logically isolated from the processor.

Aspects of the subject matter described herein may be useful alone or in combination with one or more other aspects described herein. In a 14th exemplary aspect of the present disclosure a method includes receiving content data. The method also includes generating a checksum of the content data. The method also includes sending the checksum to a trusted platform module. The method also includes loading an encrypted private key into the trusted platform module. The trusted platform module decrypts the encrypted private key to obtain a private key and encrypts the checksum with the private key. The method also includes receiving the encrypted checksum from the trusted platform module. The method also includes sending the content data together with the encrypted checksum to an external device. The private key belongs to an asymmetric key pair generated by the trusted platform module. The asymmetric key pair includes the private key and a public key.

In accordance with a 15th exemplary aspect of the present disclosure, which may be used in combination with any one or more of the preceding aspects (e.g., the 14th aspect), the content data includes a first sequence of data and a second sequence of data and the method further includes generating a first checksum of the first sequence of data, sending the first checksum to the trusted platform module, and loading the encrypted private key into the trusted platform module. The method also further includes generating a second checksum of the second sequence of data after sending the first checksum and loading the encrypted private key, and sending the second checksum to the trusted platform module.

In accordance with a 16th exemplary aspect of the present disclosure, which may be used in combination with any one or more of the preceding aspects (e.g., the 15th aspect), the second sequence of data is subsequent in time to the first sequence of data.

In accordance with a 17th exemplary aspect of the present disclosure, which may be used in combination with any one or more of the preceding aspects (e.g., the 15th aspect), the trusted platform module encrypts the second checksum with the private key.

In accordance with a 18th exemplary aspect of the present disclosure, which may be used in combination with any one or more of the preceding aspects (e.g., the 14th aspect), the method further includes receiving the encrypted private key from the trusted platform module prior to receiving the content data.

In accordance with a 19th exemplary aspect of the present disclosure, which may be used in combination with any one or more of the preceding aspects (e.g., the 14th aspect), the method further includes sending the public key to a public key database.

Aspects of the subject matter described herein may be useful alone or in combination with one or more other aspects described herein. In a 20th exemplary aspect of the present disclosure, a non-transitory computer-readable medium stores instructions which, when performed by a processor, cause the processor to receive content data. The instructions also cause the processor to generate a checksum of the content data. The instructions also cause the processor to send the checksum to a trusted platform module. The instructions also cause the processor to load an encrypted private key into the trusted platform module. The trusted platform module decrypts the encrypted private key to obtain a private key and encrypts the checksum with the private key. The instructions also cause the processor to receive the encrypted checksum from the trusted platform module. The instructions also cause the processor to send the content data together with the encrypted checksum to an external device. The private key belongs to an asymmetric key pair generated by the trusted platform module. The asymmetric key pair includes the private key and a public key.

In accordance with a 21st exemplary aspect of the present disclosure, which may be used in combination with any one or more of the preceding aspects (e.g., the 20th aspect), the public key is configured to decrypt the encrypted checksum.

In accordance with a 22nd exemplary aspect of the present disclosure, which may be used in combination with any one or more of the preceding aspects (e.g., the 20th aspect), the trusted platform module stores an endorsement key corresponding to a certificate that identifies the trusted platform module.

Aspects of the subject matter described herein may be useful alone or in combination with one or more other aspects described herein. In a 23rd exemplary aspect of the present disclosure, a system includes a trusted platform module means, a means for receiving content data, and a means for generating a checksum of the content data. The system also includes a means for sending the checksum to the trusted platform module and a means for loading an encrypted private key into the trusted platform module means. The trusted platform module provides a means for decrypting the encrypted private key to obtain a private key, and encrypting the checksum with the private key. The system also includes a means for receiving the encrypted checksum from the trusted platform, and a means for sending the content data together with the encrypted checksum to an external device. The private key belongs to an asymmetric key pair generated by the trusted platform module. The asymmetric key pair includes the private key and a public key.

Aspects of the subject matter described herein may be useful alone or in combination with one or more other aspects described herein. In a 24th exemplary aspect of the present disclosure, a system includes a processor and a memory storing instructions, which when executed by the processor, cause the processor to receive content data together with an encrypted checksum of the content data. The instructions also cause the processor to decrypt the encrypted checksum using a public key to obtain a received checksum. The instructions also cause the processor to generate a checksum of the received content data. The instructions also cause the processor to compare the generated checksum with the received checksum. Responsive, to the generated checksum matching the received checksum, the instructions also cause the processor to execute processing corresponding to the content data.

In accordance with a 25th exemplary aspect of the present disclosure, which may be used in combination with any one or more of the preceding aspects (e.g., the 24th aspect), the content data includes sensor data.

In accordance with a 26th exemplary aspect of the present disclosure, which may be used in combination with any one or more of the preceding aspects (e.g., the 25th aspect), the sensor data includes one or more of the group consisting of temperature, humidity, gas, pressure, chemical, fluid level, water quality, smoke, movement, proximity, acceleration, gyroscope, infrared, optical, and image.

In accordance with a 27th exemplary aspect of the present disclosure, which may be used in combination with any one or more of the preceding aspects (e.g., the 24th aspect), the content data includes one or more forms of media.

In accordance with a 28th exemplary aspect of the present disclosure, which may be used in combination with any one or more of the preceding aspects (e.g., the 27th aspect), the content data includes video data.

In accordance with a 29th exemplary aspect of the present disclosure, which may be used in combination with any one or more of the preceding aspects (e.g., the 28th aspect), the video data includes a plurality of frames including a first set of two or more frames and a second set of two or more frames, and the instructions further cause the processor to receive the first set together with the a first encrypted checksum of the first set, decrypt the first encrypted checksum using the public key to obtain a first received checksum, and generate a first checksum of the received first set. The instructions also cause the processor to compare the generated first checksum with the first received checksum. Responsive to the generated first checksum matching the first received checksum, the instructions also cause the processor to cause the first set to be displayed. The instructions also cause the processor to receive the second set together with the a second encrypted checksum of the second set, decrypt the second encrypted checksum using the public key to obtain a second received checksum, and generate a second checksum of the received second set. The instructions also cause the processor to compare the generated second checksum with the second received checksum. Responsive to the generated second checksum matching the second received checksum, the instructions also cause the processor to cause the second set to be displayed.

In accordance with a 30th exemplary aspect of the present disclosure, which may be used in combination with any one or more of the preceding aspects (e.g., the 28th aspect), the video data includes a sequence of frames including a first frame, a second frame, and a third frame, and the instructions further cause the processor to receive the first frame together with a first encrypted checksum of the first frame, decrypt the first encrypted checksum using the public key to obtain a first received checksum, and generate a first checksum of the received first frame. The instructions also cause the processor to compare the generated first checksum with the first received checksum. Responsive to the generated first checksum matching the first received checksum, the instructions also cause the processor to cause the first frame to be displayed. The instructions also cause the processor to receive the second frame, and to cause the second frame to be displayed. The instructions also cause the processor to receive the third frame together with a second encrypted checksum of the third frame, decrypt the second encrypted checksum using the public key to obtain a second received checksum, and generate a second checksum of the received third frame. The instructions also cause the processor to compare the generated second checksum with the second received checksum. Responsive to the generated second checksum matching the second received checksum, the instructions also cause the processor to cause the third frame to be displayed.

Aspects of the subject matter described herein may be useful alone or in combination with one or more other aspects described herein. In a 31st exemplary aspect of the present disclosure, a method includes receiving content data together with an encrypted checksum of the content data. The method also includes decrypting the encrypted checksum using a public key to obtain a received checksum. The method also includes generating a checksum of the received content data. The method also includes comparing the generated checksum with the received checksum. Responsive to the generated checksum matching the received checksum, the method also includes executing processing corresponding to the content data.

In accordance with a 32nd exemplary aspect of the present disclosure, which may be used in combination with any one or more of the preceding aspects (e.g., the 31st aspect), the method further includes requesting the public key from an external database.

In accordance with a 33rd exemplary aspect of the present disclosure, which may be used in combination with any one or more of the preceding aspects (e.g., the 31st aspect), responsive to at least one of failing to decrypt the encrypted checksum or the generated checksum failing to match the received checksum, the method further includes generating an alert.

In accordance with a 34th exemplary aspect of the present disclosure, which may be used in combination with any one or more of the preceding aspects (e.g., the 33rd aspect), the method further includes requesting the content data to be sent again.

Aspects of the subject matter described herein may be useful alone or in combination with one or more other aspects described herein. In a 35th exemplary aspect of the present disclosure, a non-transitory computer-readable medium stores instructions, which when performed by a processor, cause the processor to receive content data together with an encrypted checksum of the content data. The instructions also cause the processor to decrypt the encrypted checksum using a public key to obtain a received checksum. The instructions also cause the processor to generate a checksum of the received content data. The instructions also cause the processor to compare the generated checksum with the received checksum. Responsive to the generated checksum matching the received checksum, the instructions also cause the processor to execute processing corresponding to the content data.

In accordance with a 36th exemplary aspect of the present disclosure, which may be used in combination with any one or more of the preceding aspects (e.g., the 35th aspect), the public key belongs to an asymmetric key pair including the public key and a private key.

Aspects of the subject matter described herein may be useful alone or in combination with one or more other aspects described herein. In a 37th exemplary aspect of the present disclosure, a system includes a means for receiving content data together with an encrypted checksum of the content data. The system also includes a means for decrypting the encrypted checksum using a public key to obtain a received checksum. The system also includes a means for generating a checksum of the received content data. The system also includes a means for comparing the generated checksum with the received checksum. The system also includes a means for executing processing corresponding to the content data, responsive to the generated checksum matching the received checksum.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A system comprising:
   a processor;
   a trusted platform module;
   a memory storing instructions, which when executed by the processor, cause the processor to:
      receive an encrypted private key from the trusted platform module;
      receive content data subsequent to receiving the encrypted private key;
      generate a checksum of the content data;
      send the checksum to the trusted platform module;
      load the encrypted private key into the trusted platform module, wherein the trusted platform module is configured to:
         decrypt the encrypted private key to obtain a private key; and
         encrypt the checksum with the private key;
      receive the encrypted checksum from the trusted platform module; and
      send the content data together with the encrypted checksum to an external device,
   wherein the private key belongs to an asymmetric key pair generated by the trusted platform module, the asymmetric key pair including the private key and a public key.

2. The system of claim 1, wherein the content data includes sensor data.

3. The system of claim 2, wherein the sensor data includes one or more of the group consisting of temperature, humidity, gas, pressure, chemical, fluid level, water quality, smoke, movement, proximity, acceleration, gyroscope, infrared, optical, and image.

4. The system of claim 1, wherein the content data includes one or more forms of media.

5. The system of claim 1, wherein the instructions cause the processor to send the content data with the encrypted checksum near simultaneously with receiving the content data.

6. The system of claim 5, wherein the content data includes video data.

7. The system of claim 6, wherein the video data includes a plurality of frames including a first set of two or more frames and a second set of two or more frames, and the instructions cause the processor to generate a first checksum for the first set and a second checksum for the second set, wherein the trusted platform module encrypts each of the first and second checksums.

8. The system of claim 6, wherein the video data includes a sequence of frames including a first frame, a second frame, and a third frame, and the instructions cause the processor to generate a first checksum for the first frame, skip the second frame, and generate a second checksum for the third frame, wherein the trusted platform module encrypts each the first checksum and the second checksum.

9. The system of claim 6, wherein the video data includes a plurality of frames and the instructions cause the processor to generate a respective checksum for each respective frame in the plurality of frames, wherein the trusted platform module encrypts each of the respective checksums.

10. The system of claim 1, wherein the trusted platform module encrypts the private key and decrypts the encrypted private key with a parent key stored within the trusted platform module.

11. The system of claim 10, wherein the parent key is logically isolated from the processor.

12. The system of claim 1, wherein after the trusted platform module decrypts the encrypted private key, the private key is logically isolated from the processor.

13. A method comprising:
   receiving an encrypted private key from a trusted platform module;
   receiving content data subsequent to receiving the encrypted private key;
   generating a checksum of the content data;
   sending the checksum to the trusted platform module;
   loading the encrypted private key into the trusted platform module, wherein the trusted platform module decrypts the encrypted private key to obtain a private key and encrypts the checksum with the private key;
   receiving the encrypted checksum from the trusted platform module; and
   sending the content data together with the encrypted checksum to an external device,
   wherein the private key belongs to an asymmetric key pair generated by the trusted platform module, the asymmetric key pair including the private key and a public key.

14. The method of claim 13, wherein the content data includes a first sequence of data and a second sequence of data,
   the method further comprising:
   generating a first checksum of the first sequence of data;
   sending the first checksum to the trusted platform module;
   loading the encrypted private key into the trusted platform module;
   generating a second checksum of the second sequence of data after sending the first checksum and loading the encrypted private key; and
   sending the second checksum to the trusted platform module.

15. The method of claim 14, wherein the second sequence of data is subsequent in time to the first sequence of data.

16. The method of claim 14, wherein the trusted platform module encrypts the second checksum with the private key.

17. The method of claim 13, further comprising sending the public key to a public key database.

18. A non-transitory computer-readable medium storing instructions which, when performed by a processor, cause the processor to:

receive an encrypted private key from a trusted platform module;

receive content data subsequent to receiving the encrypted private key;

generate a checksum of the content data;

send the checksum to the trusted platform module;

load the encrypted private key into the trusted platform module, wherein the trusted platform module decrypts the encrypted private key to obtain a private key and encrypts the checksum with the private key;

receive the encrypted checksum from the trusted platform module; and send the content data together with the encrypted checksum to an external device, wherein the private key belongs to an asymmetric key pair generated by the trusted platform module, the asymmetric key pair including the private key and a public key.

19. The non-transitory computer-readable medium of claim 18, wherein the public key is configured to decrypt the encrypted checksum.

20. The non-transitory computer-readable medium of claim 18, wherein the instructions further cause the processor to send the received encrypted private key to a memory in communication with the processor for storage.

* * * * *